US012364999B2

(12) United States Patent
Di Gioia et al.

(10) Patent No.: US 12,364,999 B2
(45) Date of Patent: Jul. 22, 2025

(54) FLUSHING SYSTEM FOR A FILTER AND A PRINT HEAD

(71) Applicant: EXEL INDUSTRIES, Epernay (FR)

(72) Inventors: Michel Di Gioia, Epernay (FR); Nicolas Chouan, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 279 days.

(21) Appl. No.: 18/174,629

(22) Filed: Feb. 26, 2023

(65) Prior Publication Data

US 2023/0278343 A1 Sep. 7, 2023

(30) Foreign Application Priority Data

Mar. 4, 2022 (FR) ....................................... 2201906

(51) Int. Cl.
*B05B 15/40* (2018.01)
*B05B 15/55* (2018.01)
*B41J 2/175* (2006.01)

(52) U.S. Cl.
CPC .............. *B05B 15/40* (2018.02); *B05B 15/55* (2018.02); *B41J 2/17563* (2013.01); *B41J 2/17596* (2013.01)

(58) Field of Classification Search
None
See application file for complete search history.

(56) References Cited

U.S. PATENT DOCUMENTS

2008/0100660 A1 5/2008 Perrin et al.
2010/0039486 A1* 2/2010 Wouters .................... B41J 2/19 347/92
2019/0240988 A1 8/2019 Garcia Diez et al.
2019/0263134 A1 8/2019 Hiramoto

FOREIGN PATENT DOCUMENTS

EP 3363640 A1 8/2018

OTHER PUBLICATIONS

INPI Preliminary Search Report for French Application 2201906, Oct. 13, 2022, 2 pages.

* cited by examiner

*Primary Examiner* — Charles Capozzi
(74) *Attorney, Agent, or Firm* — Soquel Group LLC

(57) ABSTRACT

A printing system for applying a coating product, including a print head for applying the coating product flowing in the normal flow direction, a single filter positioned upstream of the print head, and a plurality of valves and conduits for conveying the coating product and at least one flush fluid. The plurality of valves and conduits being arranged so that the single filter may be flushed with the flush fluid only in the direction opposite to the normal flow direction, and so that the print head may be flushed with the flush fluid in the normal flow direction, the single filter and the print head being flushable independently of each other.

15 Claims, 12 Drawing Sheets

FLUSHING SYSTEM FOR A FILTER AND A PRINT HEAD

REFERENCE TO RELATED APPLICATION

This application is a U.S. non-provisional application claiming the benefit of French Application No. 22 01906, filed on Mar. 4, 2022, the contents of which are incorporated herein by reference in their entirety.

TECHNICAL FIELD OF THE INVENTION

The technical field of the invention is that of the application by printing of a coating product onto an object to be coated.

The present invention relates in particular to a system for applying a coating product to an object to be coated, as well as to several modes of operation of the system, which in particular allow purging, flushing, filling and application of the coating product.

BACKGROUND OF THE INVENTION

Personalization of decorations and coatings applied to objects is becoming more and more frequent. This is, for example, the case in the automotive industry for coatings on vehicle bodies. This may be monochrome, bichrome or multi-chrome paint type coatings. In addition, realization of patterns with a specific geometry, is potentially interesting for certain other markets, in particular to visually differentiate two products according to their purpose or their manufacture. In this context, the coatings industry has recently explored solutions that involve "printing" paint by means of print heads, rather than spraying it with paint spray heads.

The paints used to make these print coatings have viscosities in the range of 50 to 200 millipascal-seconds (mPas), and contain particles in the micron range. Thus, to apply such a coating product by a printing technique, equipment of suitable dimensions must be used. In particular, print heads are used the nozzles of which have a paint ejection outlet of small diameter, of the order of 100 to 200 micrometers (μm), which is much smaller than the dimensions of a of a spray head outlet, which are generally greater than 800 μm. Filters with characteristic filtering dimensions of the order of 20 micrometers (μm) are also used. The purpose of such a filter is to block agglomerates or inhomogeneities in the coating product that could clog nozzles of the print head, and thus ensure better print quality.

The requirements concerning quality of the printed coating imply regular flushing of the elements of the printing system in order to eliminate agglomerates contained in the filter or possible residues that may clump in the print head. It is interesting to flush these two elements by means of a flushing product, with a pressure adapted according to the element. Indeed, the flushing of filters may be done at high pressure with pulsed air. On the contrary, the print heads are generally flushed at lower pressures. It is moreover preferable not to use air in the fluid for flushing a print head because the presence of air risks drying and fixing of the coating product to be flushed, in particular in the nozzles. In addition, the filter becomes clogged little by little, and must be flushed regularly.

For reasons of productivity and convenience, the same print head is generally used to apply different coating products, typically paints of different colors. It is therefore necessary to flush the entire printing system in order to avoid inappropriate mixing of coating products, while respecting the specific flushing conditions of the various elements.

Techniques for flushing the print head are known from the state of the art. For example, it is possible to use a cleaning station composed of several injectors to clean several nozzles of a print head simultaneously.

Furthermore, techniques are known for flushing a filter mounted upstream of a print head in a system for applying a coating product. The filter is flushed by a flush fluid with a two-way flow. The disadvantage of such techniques is that the time required to perform this dual flushing is long and reduces printing productivity.

Use of two parallel filters installed upstream of the print head is also known. The application is done using only one of the two filters at a time, which makes it possible to flush the other filter or change it without stopping the application of the coating product. There is therefore a gain in productivity. The disadvantage is that such a solution uses a more complex and less compact valve assembly to isolate the two filters, which is penalizing for its integration into a printing system.

Furthermore, these solutions for flushing filters and print heads do not provide a printing system for flushing both elements by means of a flush fluid the pressure of which is adapted depending on the element being flushed, and for flushing the filter or print head without also having to flush the other element, or for flushing the entire printing system.

JP6979546B1 describes a printing system constituting a set of sections, each section comprising conduits, valves, and a particular element to be flushed, for example a filter, a print head, and a de-bubbler. Sections (filter, print head and de-bubbler sections) of this system are arranged so that they may be flushed independently of each other. In particular, three or four-way valves are installed before and after each element to be flushed (filter, print head and de-bubbler to isolate the element in question and to convey the products therein depending on the use (print product, rinse product or air).

The disadvantage of such a system is that it requires a large number of valves to achieve the isolation functions of the various elements that it constitutes. The arrangement of the various components of the system (valves, conduits and elements) is therefore complex and cumbersome, which is not compatible with the compactness required for such systems.

Moreover, such a complex assembly increases the risk that the components will be damaged and will be prematurely out of order, affecting the proper functioning of the system. Therefore, such a system is also not compatible with the business requirements of longevity and reliability of the coating printing system.

Furthermore, use of a specific de-gassing unit—the debubbler—implies additional valves and conduits in the assembly, which increases the size of the system and the volume of fluid lost during a color change.

EP-A-3363640 discloses a printing system that includes a print head associated with a filter through which a cleaning agent flows in the same direction as the coating agent. A significant number of fluid flow control valves are provided, making this system complex and bulky.

Thus, there is a need for a compact and reliable coating printing system that allows the filter and print head to be flushed using a flush fluid with a pressure that is tailored to the element being flushed.

SUMMARY OF THE INVENTION

The invention provides a solution to the above problems by allowing flushing of a filter and a print head of a coating printing system independently. The printing system is furthermore compact and adapted so that flushing of its elements and the entire system is achieved in a time compatible with productivity constraints for application of the coating product.

"Productivity constraints" are defined as constraints defined by productivity goals for the coating product application in question. This may include a constraint on the print run time for one or more objects to be coated.

A first aspect of the invention relates to a printing system for applying a coating product to an object to be coated, the printing system including:

- a print head for applying the coating product to the object to be coated, the coating product flowing in a so-called normal flow direction;
- a single filter positioned upstream of the print head for filtering the coating product;
- a plurality of valves and conduits adapted to convey the coating product, a filter flush fluid and a print head flush fluid, the plurality of valves and conduits being arranged to form:
  - a coating product supply circuit;
  - a filter circuit adapted to convey the coating product through the single filter in the normal flow direction and to convey the filter flush fluid through the single filter only in the direction opposite to the normal flow direction;
  - a head circuit adapted to convey coating product and print head flush fluid through the print head in the normal flow direction;
- a supply filter isolation valve configured to:
  - in a closed state, isolate the supply circuit from the filter circuit;
  - in an open state, connect the supply circuit to the filter circuit;
- a print head-filter isolation valve configured to:
  - in a closed state, isolate the filter circuit from the head circuit;
  - in an open state, connect the filter circuit to the print head circuit;

system wherein the filter circuit further includes a filter flush valve arranged vis-à-vis the filter head isolation valve and a filter purge valve arranged vis-à-vis the supply filter isolation valve, and wherein the supply filter isolation valve, the print head filter isolation valve, the filter flush valve, and the filter purge valve are two-way valves.

By "independent operation" is meant that the filter circuit and the head circuit are two circuits independent of each other, isolated by means of one or more among the plurality of valves. These two circuits may be used independently of each other. In other words, one of the circuits may be used without the second one being used, or both may be used simultaneously without use of one affecting use of the other. For example, it is possible to flush the filter circuit without also flushing the print head circuit, which is isolated during the flushing of the filter circuit. It is possible to flush the print head without flushing the filter. Furthermore, it is possible to flush the head circuit and the filter circuit simultaneously without the flushing of one interfering with the flushing of the other.

Thanks to the invention, and in particular thanks to the use of isolation valves, the printing system makes it possible to use the filter circuit including the filter and the head circuit including the print head independently. It is therefore possible to flush the filter circuit and the head circuit separately and decoupled by means of two-way valves arranged vis-à-vis each other in pairs. The system according to the invention thus makes it possible to use a flush fluid with a different pressure and adapted to the flushing of the various elements of the printing system, and in particular to the flushing of the filter and the print head. On the other hand, when the isolation valves are open, it is possible to connect the different circuits together to carry out the printing of the coating product.

Indeed, the printing system includes several circuits (supply circuit, filter circuit and print head circuit) which are isolated from each other by means of isolation valves. These circuits are used for the flow of the various fluids. In this case, the filter circuit is used for isolated flow of filter flush fluid, and the head circuit is used for isolated flow of print head flush fluid. The three circuits also allow for the flow of coating product from the supply inlet through the filter to the print head. Thanks to the isolation valves and these independent circuits, it is possible to use one circuit in isolation from the other circuits for a particular purpose. For example, it is possible to isolate the filter circuit during the printing process to flush it in order to remove excess agglomerates, without having to empty the other circuits, which contain the coating product ready to be printed.

Furthermore, since the filter and the print head belong to separate independent and isolated circuits, the filter may be flushed by means of the appropriate flush fluid without having to also flush the print head. It is therefore possible to flush only the filter circuit, and in particular the filter. This flushing of the filter alone may take place, for example, when the filter is too clogged with agglomerates of the coating product, which penalizes the proper application of coating product on the product to be coated.

In addition, since only one filter is used to filter the coating product, this filter is easy to integrate into the printing system, eliminating the need for a complex assembly requiring valves to direct fluid from one or other of the filters. This promotes compactness of the printing system.

In addition, since the isolation, flush and purge valves are two-way valves, they are not only more compact but also more reliable, since this type of valve has fewer moving parts. They also require fewer controls, actuators, etc., to operate. This makes the printing system more compact, while presenting reliability and a service life that is compatible with business requirements.

The printing system is all the more compact in that it is advantageously devoid of a return circuit (from the print head) to the supply circuit to return unused coating product (that is, not ejected by the head) and to be able to reuse it.

The arrangement vis-à-vis the valves promotes compactness of the system by limiting the number and/or length of conduits, which also contributes to reducing the footprint of the system. In particular, the portion of conduit between two facing valves, hereinafter referred to as the common conduit portion, may be short in length to reduce the volume common to the two valves.

Finally, flushing of the filter or the print head may be carried out in a time compatible with the productivity requirements linked to the printing activity. Indeed, the filter and the print head may be flushed both separately and simultaneously. There is, therefore, no need to wait for the filter to be flushed before flushing the print head, and vice versa. In addition, the printing system assembly being compact, the flow of flush fluids in the printing system assembly is fast. The filter being only flushed in the direction opposite to the normal flow direction (i.e., the optimal direction for flushing the filter), there is no need for a second flush. The filter is therefore flushed quickly. Similarly, the print head is cleaned only in the normal flow direction, which allows the print head to be flushed quickly.

In one embodiment of the printing system:

the supply filter isolation valve, the print head filter isolation valve, the filter flush valve, and the filter purge valve each include a seat and a needle for abutting the seat;

the needle of the filter flush valve and the needle of the print head-filter isolation valve are aligned and point in opposite directions toward a first common conduit portion.

the needle of the filter purge valve and the needle of the supply filter isolation valve are aligned and point in opposite directions toward a second common conduit portion.

According to an elaboration of this embodiment:

the first common conduit portion separates the filter flush valve seat and the print head-filter isolation valve seat, and presents a length between 1 mm and 10 mm;

the second common conduit portion separates the filter purge valve seat and the supply filter isolation valve seat, and presents a length between 1 mm and 10 mm.

This small distance between facing valves helps to limit the amount of coating product needed to prime and refill the printing system, for example when the system is first used or when the coating product is changed (typically a change in paint color). It also promotes compactness of the printing system.

In one embodiment, the printing system further includes a filter flush inlet, the filter flush inlet being adapted to supply the filter flush fluid to the filter circuit, and wherein the filter flush valve is configured to:

in an open state, connect the single filter to the filter flush inlet;

in a closed state, isolate the single filter from the filter flush inlet.

In this manner, it is possible to control supply of the filter flush fluid to the single filter from the printing system, and to prevent flow of coating product toward the filter flush inlet as coating product flows through the printing system.

In one embodiment, the filter circuit further includes a filter purge outlet, the filter purge outlet being adapted to purge the filter circuit of the filter flush fluid, the filter purge valve being configured to:

in an open state, connect the single filter and the filter purge outlet;

in a closed state, isolate the single filter from the filter purge outlet.

In this manner, it is possible to control discharge of filter flush fluid from the printing system after flowing through the filter, and to prevent flow of coating product to the filter purge outlet as coating product flows through the printing system.

In one embodiment, the supply circuit includes a supply inlet, a supply purge valve, and a supply purge outlet, the supply inlet being adapted to supply coating product to the supply circuit, the supply purge outlet being adapted to purge coating product from the supply circuit, the supply purge valve being configured to:

in an open state, connect the supply inlet and the supply purge outlet;

in a closed state, isolate the supply inlet from the supply purge outlet.

In this manner, it is possible to control supply of the coating product in the supply circuit and to control discharge of coating product from the supply circuit.

In one embodiment, the printing system includes a fill purge circuit and a fill purge isolation valve, the fill purge isolation valve being configured to:

in an open state, connect the head circuit and the fill purge circuit;

in a closed state, isolate the head circuit and the fill purge circuit.

The fill purge circuit allows coating product to be evacuated from the printing system after having circulated through the single filter. In particular, it is used to expel air bubbles contained in the filter circuit, for example after cleaning the filter with pressurized air.

According to a development of this embodiment, the head circuit further includes a print head flush valve arranged vis-à-vis the fill purge isolation valve. Advantageously, the print head flush valve and the fill purge isolation valve are two-way valves.

Preferably, the print head flush valve and the fill purge isolation valve each include a seat and a needle for abutting the seat. The needle of the print head flush valve and the needle of the fill purge isolation valve are aligned and point in opposite directions toward a third common conduit portion.

Advantageously, the third common conduit portion separates the print head flush valve seat and the fill purge isolation valve seat, and presents a length of between 1 mm and 10 mm.

In one embodiment, the head circuit further includes a print head flush inlet, the print head flush inlet being adapted to supply print head flush fluid to the print head circuit, the print head flush valve being configured to:

in an open state, connect the print head and the print head flush inlet;

in a closed state, isolate the print head from the print head flush inlet.

In this way, supply of print head flush fluid toward the print head may be controlled, and the flow of coating product to the print head flush inlet may be prevented as coating product flows through the printing system.

In one embodiment, the head circuit further includes a print head purge valve and a print head purge outlet, the print head purge outlet being adapted to purge the head circuit of the print head flush fluid and coating product, the print head purge valve being configured to:

in an open state, connect the print head and the print head purge outlet;

in a closed state, isolate the print head from the print head purge outlet.

In this way, it is possible to allow print head flush fluid or coating product to be discharged from the printing system through the print head purge outlet after flowing through the print head, or to block flow of print head flush fluid or coating product toward the print head purge outlet. In addition, if the print head outlets are closed, closing the print head purge valve will block the flow of product toward the print head.

In one embodiment, the single filter includes a mesh layer configured to filter the coating product, the mesh layer being arranged between two support layers.

The filter is then simple in design and easy to integrate into the printing system.

In one embodiment, the single filter includes a first end and a second end, the single filter being arranged so that coating product is conveyed along the axis of the filter by entering the first end of the filter and exiting the second end, and flush fluid is conveyed along the axis of the filter by entering the second end of the filter and exiting the first end.

Thus, priming of the single filter with coating product is completely accomplished without retention of air in the single filter. Furthermore, flushing of the single filter is accomplished such that filter flush fluid flushes the entire filter space.

In one embodiment, the system further includes a monitoring sensor. The monitoring sensor is preferably a pressure sensor arranged in the print head or between the print head and the print head purge valve.

The system is thus monitored by means of the monitoring sensor, and operation of the system is adapted based on data collected by the monitoring sensor. For example, when the sensor measures a pressure lower than a nominal level in the print head, it warns that printing of coating product is no longer being carried out under conditions that meet specifications for the current printing, and the system is positioned in a mode of operation to flush the filter clogged with agglomerates that are impeding the proper flow of coating product.

In addition to the features just discussed in the preceding paragraphs, the system according to the first aspect of the invention may present one or more of the following additional features, considered individually or in any technically feasible combinations:

- the supply filter isolation valve is arranged upstream of the single filter;
- the print head-filter isolation valve is arranged downstream of the single filter.

A second aspect of the invention relates to a method for controlling the printing system according to the first aspect of the invention, the control method including one or more operations from among the following operations:

- priming at least a portion of the printing system with a coating product;
- printing of coating product onto the object to be coated;
- flushing the print head; and
- flushing the single filter.

The printing system according to the invention may be controlled to prime the printing system with a coating product, apply coating product to the object to be coated, or flush one or more elements of the printing system.

In one embodiment, the operations of flushing the print head and flushing the single filter are implemented simultaneously, by closing the supply filter isolation valve and the print head filter isolation valve.

In this way, it is possible to control the printing system so that the print head and the single filter are flushed simultaneously and independently of each other. This method of implementation saves time and therefore increases productivity.

In one embodiment, the control method includes an operation of priming a coating product supply circuit and in which the operations of flushing the single filter and priming the supply circuit are implemented simultaneously by closing the supply filter isolation valve.

It is thus possible to control the printing system so that the single filter is flushed simultaneously and independently of priming of the supply circuit. This mode of implementation saves time and therefore increases productivity.

In one embodiment, the control method includes an operation of priming a coating product supply circuit and in which the operations of flushing the print head and priming the supply circuit are implemented simultaneously by closing the print head filter isolation valve.

It is thus possible to control the printing system so that the print head is flushed simultaneously and independently of the priming of the supply circuit. This mode of implementation saves time and consequently increases productivity.

In addition to the features just mentioned in the preceding paragraphs, the control method according to the second aspect of the invention may present one or more additional features from among the following, considered individually or according to any technically feasible combination:

- the pressure of the filter flush fluid is strictly higher than the pressure of the print head flush fluid;
- the pressure of the filter flush fluid is between 4 bar and 8 bar;
- the pressure of the print head flush fluid is between 1 bar and 3 bar;
- the single filter is flushed by successively conveying air and a flush liquid, preferably a solvent;
- the print head is flushed by conveying a flush liquid, preferably a solvent.

BRIEF DESCRIPTION OF THE DRAWINGS

The invention and its various applications will be better understood upon reading the following description and examining the accompanying figures.

The figures are presented as an indication and in no way limit the invention.

DETAILED DESCRIPTION

Figure 1:
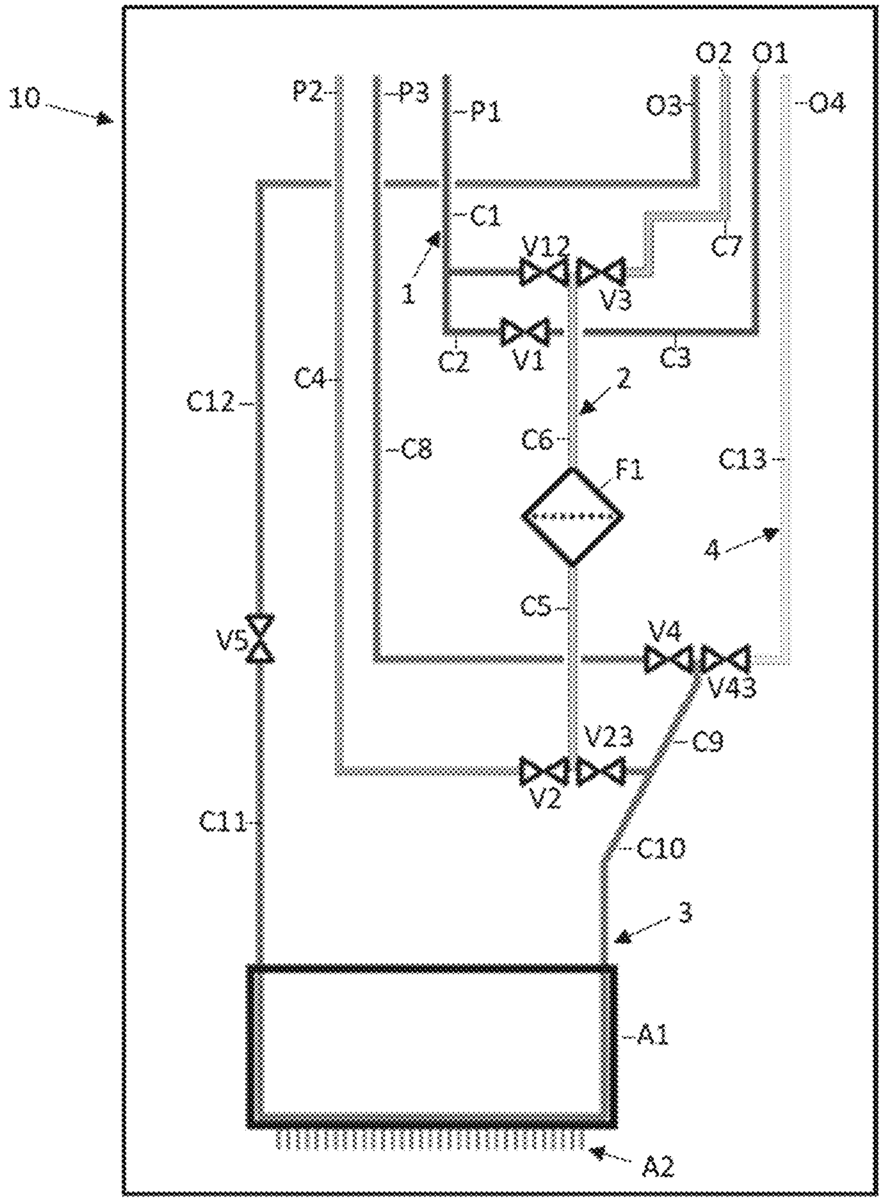
FIG. 1 is a fluidic diagram of a preferred embodiment of the system according to the invention.

Unless otherwise specified, a same element appearing in different figures presents a unique reference.

In the following text, and unless otherwise specified, it is understood that:

- “coating product” a compound of an inorganic or organic nature that is intended to be applied to the surface of an object to be coated by means of a printing technique, with a view to giving it a desired functionality. For example, in the case of the automotive industry, this may include coating products for the coloring and protecting of the vehicle chassis. More specifically, the coating product may be a paint, a primer, varnish or a more viscous product such as an adhesive or sealant;

"object to be coated" an object to which it is desired to apply a coating product in order to provide a desired functionality;

"print head" an applicator device for printing coating product on the object to be coated. The print head may, furthermore, be a continuous jet print head, that is, it includes permanently open circuits and does not contain a pressurized coating product. Otherwise, the print head can be a drop-on-demand (DOD) print head. In order to control application of the coating product, the ejection outlets (also called nozzles) of a DOD head are blocked by controllable membranes;

"filter" a device for filtering coating product that prevents agglomerates or inhomogeneities in the coating product from reaching the print head and thus preventing clogging. The filter may present the form of a screen of sufficiently small size to block agglomerates but of sufficiently large size to allow particles of coating product (typically pigment particles of a paint) to flow through;

"valve" a device for regulating flow of coating product and the filter and print head flush fluids. A valve may be positioned to allow flush fluid or coating product to pass through the valve, or to block passage through the valve and divert the flow of fluid or coating product toward another path;

"conduit" a connecting device between two elements of the system, for example between two valves, which allows coating product or one of the flush fluids to be conveyed from one element to another;

"element" a component of the system according to the invention. An element may refer to a valve, a filter or a print head;

"circuit" a serial assembly of elements and conduits connecting the elements, the ends of which are constituted by an inlet and an outlet;

"normal flow direction" the direction of flow of coating product that is conveyed within the printing system so that coating product may be applied to the object to be coated by means of the print head. In this case, the normal direction of flow is that of the flow of coating product from a source for the supply of coating product toward the outlet of the print head that applies coating product;

"filter flush fluid" and "print head flush fluid" are flush fluids specifically dedicated to flushing the filter and print head, respectively. They may be the same flush fluid but used with different pressures depending on the element to be flushed. A flush fluid (filter or print head) may be a flush liquid, preferably a solvent (capable of "dissolving" coating product agglomerates) such as water. Filter flush fluid may further include air;

"supply inlet" an inlet to the system that is used to supply the system with coating product;

"purge outlet" an outlet that is used to eject flush fluids and coating product from the system and convey them to the recovery and treatment manifolds;

"flush inlet" a system inlet that is used to supply flush fluid to the system;

"isolation valve" a valve that isolates or connects two circuits independent of each other; and "system mode of operation" a specific arrangement in which system valves are opened or closed and which allows the system to be used for a particular application. For example, closing or opening of certain valves allows certain parts of the system or certain circuits to be isolated to use the circuit for a specific application, such as filter flushing, print head flushing, system purging, or coating product printing.

One aspect of the invention relates to a printing system for applying a coating product to an object to be coated.

FIG. 1 shows a fluidic diagram of a system 10 according to a preferred embodiment of the invention.

System 10 includes a print head A1, a single filter F1 and a plurality of valves and conduits. Preferably, the valves are two-way valves. Each two-way valve includes a seat and a needle, the needle being intended to abut the seat to close the valve.

The print head is used to print coating product onto the object to be coated. Coating product is expelled from print head A1 by pressurizing coating product in system 10.

The print head includes a number of outlets for printing the coating product onto the object to be coated. These printing outlets are referred to as nozzles A2. The print head may include a plurality of nozzles A2 that are arranged in a line or in a grid pattern (a plurality of parallel lines).

In print head A1, coating product flows along the normal flow direction, that is, the coating product is conveyed to the inlet of print head A1 by means of a portion of the valves and conduits, and is expelled through nozzles A2.

The single filter F1 is used to filter coating product before it reaches the print head to prevent agglomerates of coating product from clogging and blocking nozzles A2 of print head A1. Since the diameter of the nozzles is, for example, in the range of 100 to 200 micrometers (μm), the filter advantageously serves to filter out any agglomerates or particles of coating product whose characteristic size is, for example, in the range of 20 μm or more. In printing system 10, the single filter F1 is then positioned upstream of print head A1 in the coating product flow path.

The single filter is a filter used in printing applications, such as a screen. Preferably, it is a dome-shaped filter and includes filter meshes of different characteristic sizes. In this case, the filter is composed of three superimposed meshes. The upper and lower meshes have a characteristic mesh size (that is, the width of a gap in the mesh) of between 100 μm and 900 μm, preferably between 350 μm and 550 μm. These two meshes therefore filter agglomerates larger than their characteristic size and, in addition, have a mechanical function of supporting the intermediate mesh. The upper and lower meshes therefore present sufficient mechanical characteristics to prevent deformation of the filter, particularly the intermediate mesh, during normal operation and during cleaning phases. The mesh size of the intermediate mesh has a characteristic dimension of between 1 μm and 100 μm, preferably between 10 μm and 30 μm, and is used to filter agglomerates whose size is greater than this characteristic dimension. It is this intermediate mesh that ensures that the coating product does not block nozzles A2 of print head A1 when it reaches them. This structure thus makes it possible to ensure good filtration performance thanks to the intermediate mesh, and to maintain this intermediate mesh in a position that makes it possible to greatly limit degradation of fluidic performance, by limiting deformation of the intermediate mesh by supporting it between the lower mesh and the upper mesh.

The plurality of valves and conduits are arranged to provide a path for coating product to flow through system 10. Coating product is conveyed by a portion of the valves and conduits so that it flows in the normal flow direction. The assembly is constructed so that the normal flow direction leads coating product from filter F1 to print head A1.

The plurality of valves and conduits are also arranged to provide a flush fluid flow path for filter F1 and for print head A1. Flush fluid for filter F1 is referred to as "filter flush fluid". Flush fluid for print head A1 is referred to as "print head flush fluid". Filter flush fluid is conveyed by a portion of the valves and conduits so that it flows in the opposite direction to the normal flow direction. Print head flush fluid is conveyed by all of the valves and conduits so that it flows in the normal flow direction. Flow of these two fluids through system 10 will be detailed later.

Preferably, the conduits of printing system 10 are as short as possible. This limits the distance that coating product must travel from one circuit to the other. This arrangement of printing system 10 is therefore optimized to limit waste and loss of coating product to fill the elements and conduits of printing system 10. In addition, this arrangement improves compactness of system 10 and therefore its integration into an installation for printing objects to be coated. Preferably, the conduits are less than or equal to 200 mm in length.

Thus, as illustrated in FIG. 1, system 10 also includes three separate inlets and four separate outlets.

Inlets of system 10 are: a supply inlet P1, a filter flush inlet P2, and a print head flush inlet P3.

The outlets of system 10 are: a supply purge outlet O1, a filter purge outlet O2, a print head purge outlet O3, and a fill purge outlet O4.

The plurality of valves and conduits are further arranged to form three different circuits and isolable from each other for conveying coating and flushing products in system 10.

These three circuits are: a supply circuit 1, a filter circuit 2 and a head circuit 3.

Printing system 10 may further include a fourth fill purge circuit 4.

These four circuits are connected to each other by means of so-called isolation valves. Supply circuit 1 is connected to filter circuit 2 by a supply filter isolation valve V12. Filter circuit 2 is connected to head circuit 3 by a print head-filter isolation valve V23. Head circuit 3 is connected to fill purge circuit 4 by a fill purge isolation valve V43.

Supply circuit 1 includes: supply inlet P1, a supply purge valve V1, a first conduit C1, a second conduit C2, a third conduit C3 and supply purge outlet O1.

In supply circuit 1, first conduit C1 connects supply inlet P1 to supply filter isolation valve V12; the second conduit C2 connects supply filter isolation valve V12 to supply purge valve V1; and the third conduit C3 connects the supply purge valve V1 to the supply purge outlet O1.

Alternatively, as long as third conduit C3 connects supply purge valve V1 to supply purge outlet O1, first conduit C1 may connect supply inlet O1 to supply purge valve V1, and second conduit C2 may connect supply purge valve V1 to supply filter isolation valve V12 without altering operation of printing system 10.

Filter circuit 2 includes: filter flush inlet P2, a filter flush valve V2, a filter purge valve V3, the single filter F1, a fourth conduit C4, a fifth conduit C5, a sixth conduit C6, a seventh conduit C7, and filter purge outlet O2.

In filter circuit 2, fourth conduit C4 connects filter flush inlet P2 to filter flush valve V2; fifth conduit C5 connects filter flush valve V2 to the single filter F1; sixth conduit C6 connects filter F1 to filter purge valve V3; and the seventh conduit C7 connects filter purge valve V3 to filter purge outlet O2. Relative to the normal flow direction in filter circuit 2, filter flush valve V2 is therefore positioned downstream of the single filter F1 and filter purge valve V3 is positioned upstream of the single filter F1.

The single filter F1 is arranged in series in filter circuit 2, that is, the flow axis of filter flush fluid or coating product in the single filter is parallel to the flow axis of the product in filter circuit 2. In other words, the single filter includes two ends for the inlet and outlet of products therein, the axis of the filter indicated by its two ends is aligned with the flow axis of coating or filter flushing products in filter circuit 2.

Head circuit 3 includes: print head flush inlet P3, a print head flush valve V4, a print head purge valve V5, print head A1, an eighth conduit C8, a ninth conduit C9, a tenth conduit C10, an eleventh conduit C11, a twelfth conduit C12, and print head purge outlet O3.

In head circuit 3, eighth conduit C8 connects print head flush inlet P3 to print head flush valve V4; ninth conduit C9 connects print head flush valve V4 to print head-filter isolation valve V23; tenth conduit C10 connects print head-filter isolation valve V23 to print head A1; eleventh conduit C11 connects print head A1 to print head purge valve V5; and twelfth conduit C12 connects print head purge valve V5 to print head purge outlet O3. Relative to the normal flow direction in head circuit 3, print head flush valve V4 is therefore positioned upstream of print head A1 and print head purge valve V5 is positioned downstream of print head A1.

Fill purge circuit 4 includes a thirteenth conduit C13 and fill purge outlet O4.

In fill purge circuit 4, thirteenth conduit C13 connects fill purge isolation valve V43 to fill purge outlet O4.

When supply purge valve V1 is open, it allows flow of products between supply inlet P1 and supply purge outlet O1. The term "products" covers both coating and flushing products. This sequence allows in particular to quickly fill first conduit C1 and second conduit C2 with coating product. When supply purge valve V1 is closed, this flow is not possible. Supply purge valve V1 therefore allows to connect or isolate supply inlet P1 and supply purge outlet O1. In particular, supply purge valve V1 allows flow of coating product in supply circuit 1 to be blocked.

When filter flush valve V2 is open, it allows flow of products between filter flush inlet P2 and single filter F1. When filter flush valve V2 is closed, this flow is not possible. Filter flush valve V2 therefore allows to connect or isolate the single filter F1 from filter flush inlet P2. In particular, filter flush valve V2 allows, in the open position, flow of filter flush fluid into filter circuit 2 from filter flush inlet P2, and, in the closed position, blocks flow of coating product toward filter flush inlet P2.

When filter purge valve V3 is open, it allows flow of products between the single filter F1 and filter purge outlet O2. When filter purge valve V3 is closed, this flow is not possible. Filter purge valve V3 therefore allows the single filter F1 to be connected to or isolated from filter purge outlet O2. In particular, filter purge valve V3 allows, in the open position, the flow of filter flush fluid toward filter purge outlet O2, and, in the closed position, blocks flow of coating product to filter purge outlet O2.

When print head flush valve V4 is open, it allows product flow between print head flush inlet P3 and print head A1. When print head flush valve V4 is closed, this flow is not possible. Closing print head flush valve V4 also allows to maintain pressure of coating product in print head A1. Print head flush valve V4 therefore allows to connect or isolate print head A1 and print head flush inlet P3. In particular, print head flush valve V4 allows, in the open position, flow of print head flush fluid in head circuit 3 from print head flush inlet P3, and, in the closed position, blocks flow of coating product toward print head flush inlet P3.

When print head purge valve V5 is open, it allows flow of products between print head A1 and print head purge outlet O3. When print head purge valve V5 is closed, this flow is not possible. Closing print head purge valve V5 also allows to maintain pressure of coating product in print head A1. Print head purge valve V5 thus allows to connect or isolate print head A1 and print head purge outlet O3. In particular, print head purge valve V5 allows, in the open position, the flow of print head flush fluid or of coating product, in head circuit 3, toward print head purge outlet O3, and, in the closed position, to block flow of coating product or of print head flush fluid toward print head purge outlet O3. Furthermore, when print head purge valve V5 is closed and nozzles A2 of print head A1 are also closed, then flow of coating product and print head flush fluid to print head A1 is blocked.

Supply filter isolation valve V12 is positioned vis-à-vis filter purge valve V3 so as to allow supply circuit 1 to be connected to filter circuit 2 at sixth conduit C6.

"Positioned vis-à-vis" is defined as an assembly of two valves whose needles are aligned (i.e., oriented in the same direction). Preferably, the needles of the two valves in question point in opposite directions, toward each other, toward a common conduit portion.

Supply filter isolation valve V12 and filter purge valve V3 are arranged so that their respective seats are separated by the common conduit portion (C6). The length of this common conduit portion is advantageously between 1 mm and 10 mm. The spacing between the two seats is, for example, equal to 5 mm. In particular, the spacing between the two seats may be equal to the diameter of the seats.

Relative to the normal flow direction, supply filter isolation valve V12 is therefore positioned, in printing system 10, upstream of the single filter F1 and downstream of supply inlet P1.

Supply filter isolation valve V12 thus allows to isolate supply circuit 1 and filter circuit 2 when this valve is closed, and there is flow of products only between first conduit C1 and second conduit C2, if supply purge valve V1 is open. On the contrary, when supply filter isolation valve V12 is open, the two circuits are connected and the different products can transit from one to the other. Flow of the products is then possible between first conduit C1, second conduit C2, and sixth conduit C6. In addition, flow of products in second conduit C2 may be stopped if supply purge valve V1 is closed.

More generally, supply filter isolation valve V12 is arranged to be as close as possible to filter purge valve V3.

Print head-filter isolation valve V23 is positioned vis-à-vis filter flush valve V2 so as to allow head circuit 3 to be connected to filter circuit 2 at the level of fifth conduit C5. Preferably, the seats of these valves are separated by a common conduit portion (C5) of length between 1 mm and 10 mm, for example equal to 5 mm. In particular, the spacing between the two seats can be equal to the diameter of the seats. Relative to the normal flow direction, print head-filter isolation valve V23 is therefore positioned, in printing system 10, downstream of the single filter F1 and upstream of print head A1.

Print head-filter isolation valve V23 allows to isolate filter circuit 2 and head circuit 3 when this valve is closed, and there is flow of products only within the respective circuits. On the contrary, when print head-filter isolation valve V23 is open, the two circuits are connected and different products may pass from one to the other. Flow of the products is then possible between fifth conduit C5, ninth conduit C9, and tenth conduit C10. In addition, flow of products in ninth conduit C9 may be stopped if print head flush valve V4 is closed. Flow may also be stopped in tenth conduit C10 if print head purge valve V5 is closed and nozzles A2 of print head A1 are not open.

More generally, print head-filter isolation valve V23 is arranged to be as close as possible to filter flush valve V2.

Preferably, print head-filter isolation valve V23 is open to allow coating product to flow through printing system 10 from supply inlet P1 to head circuit 3.

In the presence of fill purge circuit 4, fill purge isolation valve V43 is advantageously positioned vis-à-vis print head flush valve V4 so as to allow fill purge circuit 4 to be connected to head circuit 3 at ninth conduit C9. Preferably, the seats of these valves are separated by a common conduit portion (C9) of length between 1 mm and 10 mm, for example equal to 5 mm. In particular, the spacing between the two seats may be equal to the diameter of the seats.

Fill purge isolation valve V43 allows fill purge circuit 4 and head circuit 3 to be isolated when this valve is closed. On the contrary, when this valve is open, the two circuits are connected and the different products may flow from one to the other. In this case, products may flow between ninth conduit C9 and thirteenth conduit C13 when fill purge isolation valve V43 is open. Fill purge isolation valve V43 therefore connects or isolates print head A1 from fill purge outlet A4.

More generally, fill purge isolation valve V43 is further arranged to be as close as possible to print head flush valve V4.

Relative to the normal direction of flow, fill purge isolation valve V43 is therefore positioned, in printing system 10, upstream of print head A1.

Therefore, opening or closing the various isolation valves allows various products to flow through different parts of system 10 from an inlet to an outlet of system 10.

The benefit of a two-way valve assembly arranged vis-à-vis is to reduce internal volume of printing system 10. This reduces coating product losses (and therefore saves coating product), in particular during a flushing phase prior to priming printing system 10 with a new coating product.

Furthermore, reduction of internal volume of printing system 10 allows to have a system 10 that meets requirements of the trade in terms of compactness. Indeed, use of facing valves positioned vis-à-vis allows for a reduction in number and/or length of various conduits of system 10. In particular, the spacing between two valves vis-à-vis, formed by a common conduit portion, is reduced thanks to this specific assembly of the valves.

Finally, assembly of the valves vis-à-vis avoids creating a dead zone in system 10. A dead zone may be defined as a zone where fluids and products in circulation have a very low speed compared to the main flow and therefore where cleaning (by mechanical action of the fluid) is not very effective. In particular, the assembly in vis-à-vis ensures that the common conduit portion is not a dead zone.

Finally, the arrangement in vis-à-vis makes the valves more easily accessible for an operator. Their installation in the system and their maintenance is then made easier. For example, arrangement in vis-à-vis allows valves to be assembled on only two opposing sides of the system body (or frame).

Figure 12:
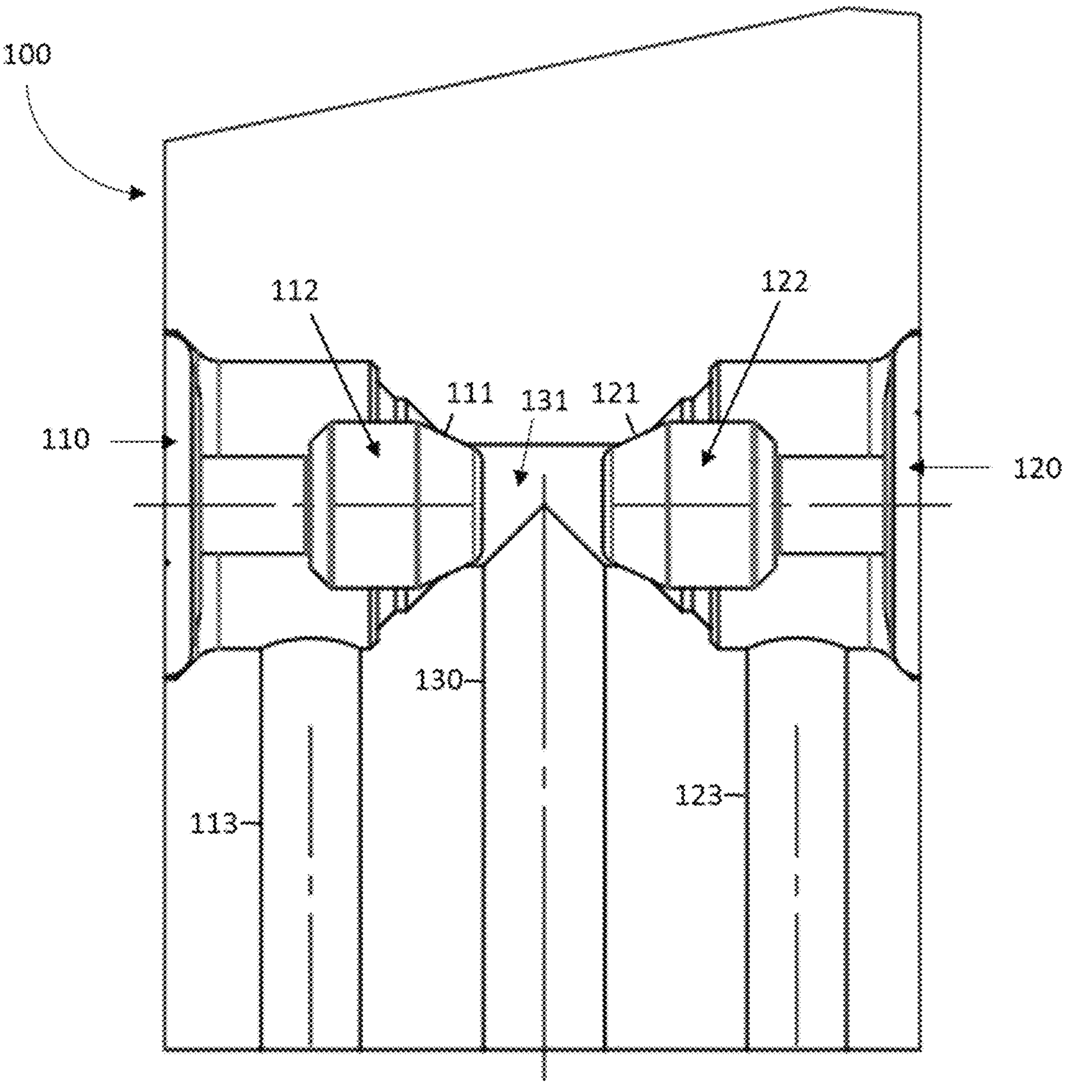
FIG. 12 is a schematic representation of the assembly vis-à-vis the two valves of the system.

An illustrative diagram of an assembly 100 in vis-à-vis of two valves is represented in FIG. 12. A first valve 110, connected to a conduit 113, includes a seat 111 and a needle 112. A second valve 120, connected to a conduit 123, includes a seat 121 and a needle 122. First valve 110 and second valve 120 are positioned vis-à-vis each other such that needle 112 of first valve 110 is directed toward needle 122 of second valve 120, and vice versa. Needles 112 and 122 are therefore directed toward each other. A common conduit 130 is connected to first valve 110 and second valve 120. Conduit 130 includes a common conduit portion 131 located between first valve 110 and second valve 120.

Indiscriminately, assembly 100 of FIG. 12 may correspond to the assembly of supply filter isolation valve V12 with filter purge valve V3, to that of the assembly of print head-filter isolation valve V23 with filter flush valve V2, or to that of the assembly of fill purge isolation valve V43 with print head flush valve V4.

The different configurations in which the valves are operated, in other words, positioned in an open or closed position, allow system 10 to be positioned in a particular mode of operation for a predefined purpose. These different modes of operation are described hereinbelow.

Thus, as illustrated in FIG. 1, supply circuit 1 is further arranged so as to be able to circulate coating product in the normal flow direction. More specifically, the normal flow direction provides for coating product to flow from supply inlet P1 to supply filter isolation valve V12 or to supply purge outlet O1.

Filter circuit 2 is further arranged so that coating product is able to circulate in the normal flow direction. The normal flow direction is from filter purge valve V3 to filter flush valve V2. Filter circuit 2 is also designed so as to be able to convey filter flush fluid in the opposite direction to the normal flow direction, that is, from filter flush fluid inlet P2 to filter purge outlet O2.

Head circuit 3 is further arranged so that coating product may be conveyed in the normal flow direction, from print head-filter isolation valve V23 to print purge outlet O3. Head circuit 3 is also designed so as to be able to convey filter flush fluid in the direction opposite to the normal flow direction from print head flush fluid inlet P3 to print purge outlet O3.

Fill purge circuit 4 is further arranged so that coating product may be conveyed in the normal flow direction, that is, from fill purge isolation valve V43 to fill purge outlet O4. This fourth circuit has, among other things, the role of allowing de-bubbling of printing system 10. This de-bubbling may take place, for example, before application of the coating product, in order to purge various circuits of any air bubbles that might degrade application conditions of coating product. De-bubbling may also take place when various circuits are filled with coating product, for example, after flushing the single filter or the print head. Fill purge circuit 4 allows to dispense with a bulky, dedicated de-bubbling module, the mechanical actuation components of which would penalize the reliability and the life of printing system 10.

System 10 also includes monitoring sensors (not represented in the figures). These sensors are positioned in the circuit so as to monitor operating status of system 10. These sensors thus serve to detect an anomaly in operation of the components of system 10. These may include sensors to determine pressure at various locations in the system. Preferably, they are pressure sensors for measuring pressure of one of the products flowing through filter F1 and that of one of the products flowing through print head A1. Thus, when an anomaly is detected on the measured pressure, an action may be implemented to resolve this anomaly. For example, if a sensor detects a pressure fault in coating product at print head A1, this may mean that filter F1 is too clogged for the pressure required for printing to be ensured in print head A1. An action of cleaning filter F1 would thus be implemented to correct this pressure fault. It is possible to place a pressure sensor upstream of the filter and another pressure sensor downstream of the filter to identify a filter saturation. It is also possible to place the sensors upstream of the supply inlet to detect a change in the monitored variable in system 10.

System 10 further includes an access hatch (not represented in the figures) that allows easy access to the single filter and to change it in a time compatible with productivity constraints when it becomes unusable or damaged.

Valves of system 10 are advantageously pneumatic valves. A "pneumatic valve" is a valve controlled by compressed air acting on a piston, which itself pulls on a needle, thus allowing passage of a fluid. A pneumatic valve is therefore pneumatically controlled in order to limit use of electric valves due to the environment in which printing system 10 is used, the environment of use being, for example, an explosive atmosphere (ATEX) environment.

The pneumatic valves may be controlled by means of a PLC (not represented) during the printing, flushing and priming actions of printing system 10. This control may, in addition, be carried out according to instructions in a memory to, for example, carry out a print sequence including printing, flushing and priming actions. The PLC may be included in printing system 10. Preferably, the PLC is outside printing system 10.

The pneumatic valves may each be connected to a solenoid valve that ensures electronic control of the pneumatic valves. The solenoid valves may be included in printing system 10 or may be outside printing system 10.

Control of valves via the solenoid valves is implemented by instructions in a memory, or transmitted by an electronic card or the PLC (not represented), the role of which is to monitor elements of the printing system. This therefore allows autonomous and automated use of printing system 10. For example, it is possible to place system 10 in a desired mode of operation based on data collected by the monitoring sensor.

The electronic card may further allow control of nozzles A2 of print head A1 for ejection of coating product through the nozzles. Control of nozzles A2 by the electronic card may be carried out depending on the phase of the printing sequence. Control of nozzles A2 may also depend on position information of the printing system with respect to the object to be coated.

The invention also relates to a method for controlling printing system 10. The control method allows various valves of printing system 10 to be actuated to place the various circuits in a specific configuration in order to implement a mode of operation of printing system 10.

The control method includes an operation of priming at least a portion of printing system 10 with a coating product. This operation allows printing system 10 to be positioned in a so-called purge and fill mode of supply circuit 1, filter circuit 2, or head circuit 3. The priming operation may be implemented so as to successively position printing system 10 in the three so-called purge and fill modes of operation of a circuit, as described below. In this priming operation, it is also possible to position system 10 in a single mode of operation known as purge and fill of a single circuit in the priming operation. Indeed, depending on the previous mode of operation in which printing system 10 was positioned, and depending on the next mode of operation in which printing system 10 will be positioned, it may turn out that only one of the so-called purge and fill modes of operation is necessary. The same reasoning applies for a combination of two of the three so-called purge and fill modes of operation mentioned above.

This mode of operation may be implemented when printing system 10 is first put into operation, after flushing the single filter F1 or print head A1, or to carry out a coating product change to prime printing system 10 with a new coating product.

The method of controlling system 10, by means of instructions from the electronic card or the PLC, allows system 10 to be positioned in a first mode of operation known as purging and filling supply circuit 1. This is also referred to as priming supply circuit 1. Priming of supply circuit 1 may, moreover, be implemented during a first priming sub-operation of supply circuit 1, of the priming operation of the control method.

Figure 2:
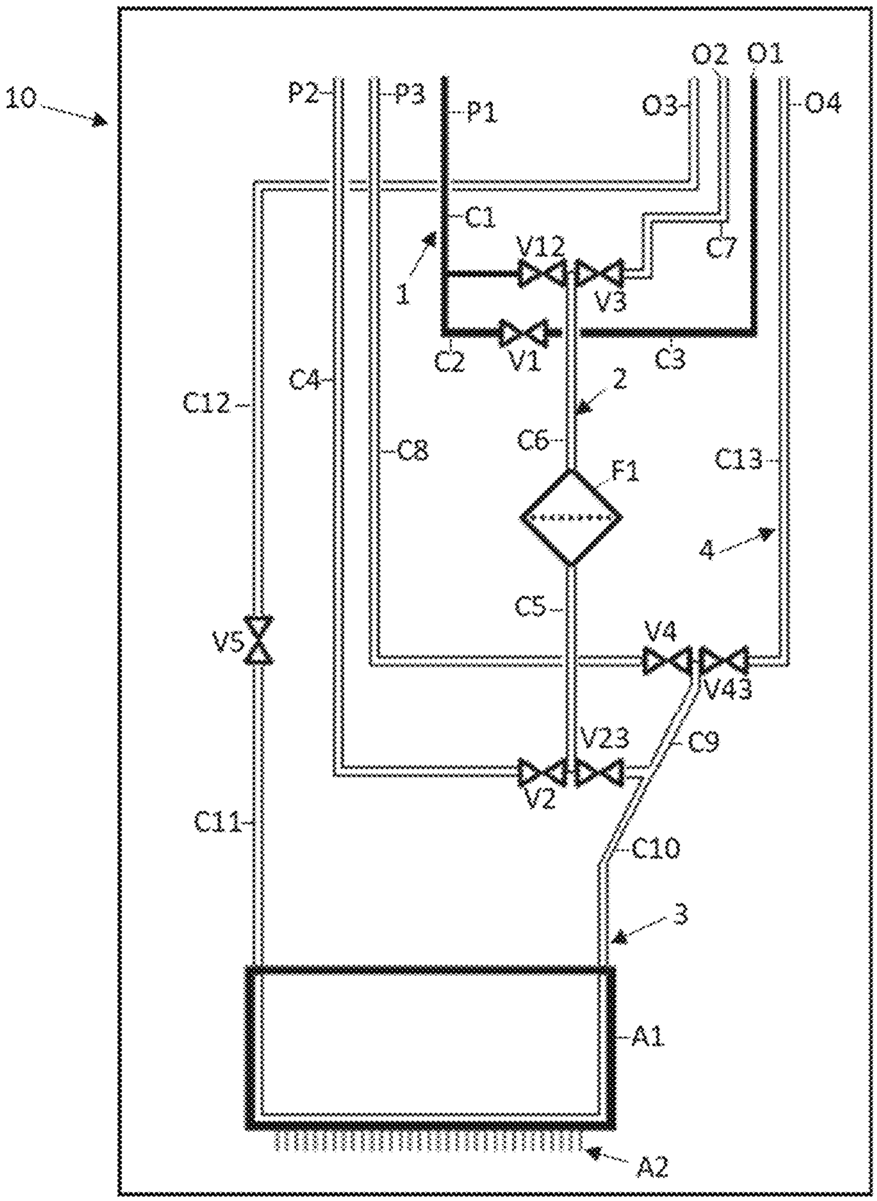
FIG. 2 is a fluidic diagram of the system according to FIG. 1 positioned in a supply circuit priming mode of operation.

This first mode of operation of purging and filling supply circuit 1 with coating product is illustrated in FIG. 2.

The objective of this first mode of operation is to isolate supply circuit 1 in order to first purge it of any residual coating product from a previous application, undesirable particles, and to purge the air contained in the conduits and the various elements of supply circuit 1, and then, in a second operation, to fill it with coating product.

In the priming sub-operation of supply circuit 1, valves of system 10 are then operated so that supply purge valve V1 is open and supply filter isolation valve V12 is closed.

Supply circuit 1 is then isolated from other circuits. Thus, coating product is circulated only in supply circuit 1.

Printing system 10 may then be supplied with coating product to purge and refill supply circuit 1. Coating product flow is in the normal flow direction from supply inlet P1 to supply purge outlet O1.

In this first mode of operation, first conduit C1, second conduit C2, third conduit C3, and supply purge valve V1 may be filled with coating product. Preferably, supply circuit 1 is filled with coating product until it passes supply purge valve V1.

System 10 is thus positioned in a mode of operation such that supply circuit 1 is purged of residues of any flush fluids and coating product that are to be expelled from supply circuit 1. The purging is effected by supply of coating product, which, as it flows from supply inlet P1 into supply circuit 1, expels unwanted residues through supply purge outlet O1. This, thus, ensures that only coating product is present in supply circuit 1, without impurities that would degrade quality of the coating product. It is, thus, also ensured that supply circuit 1 is purged of any air bubbles that could risk degrading quality of the printing. In this mode of operation, coating product flows in the normal flow direction.

During the priming operation of the control method, printing system 10 is then positioned in a second mode of operation known as purging and filling filter circuit 2 with coating product. This is also referred to as priming filter circuit 2. Priming of filter circuit 2 may, moreover, be implemented during a second sub-operation of priming filter circuit 2 of the priming operation of the control method.

Figure 3:
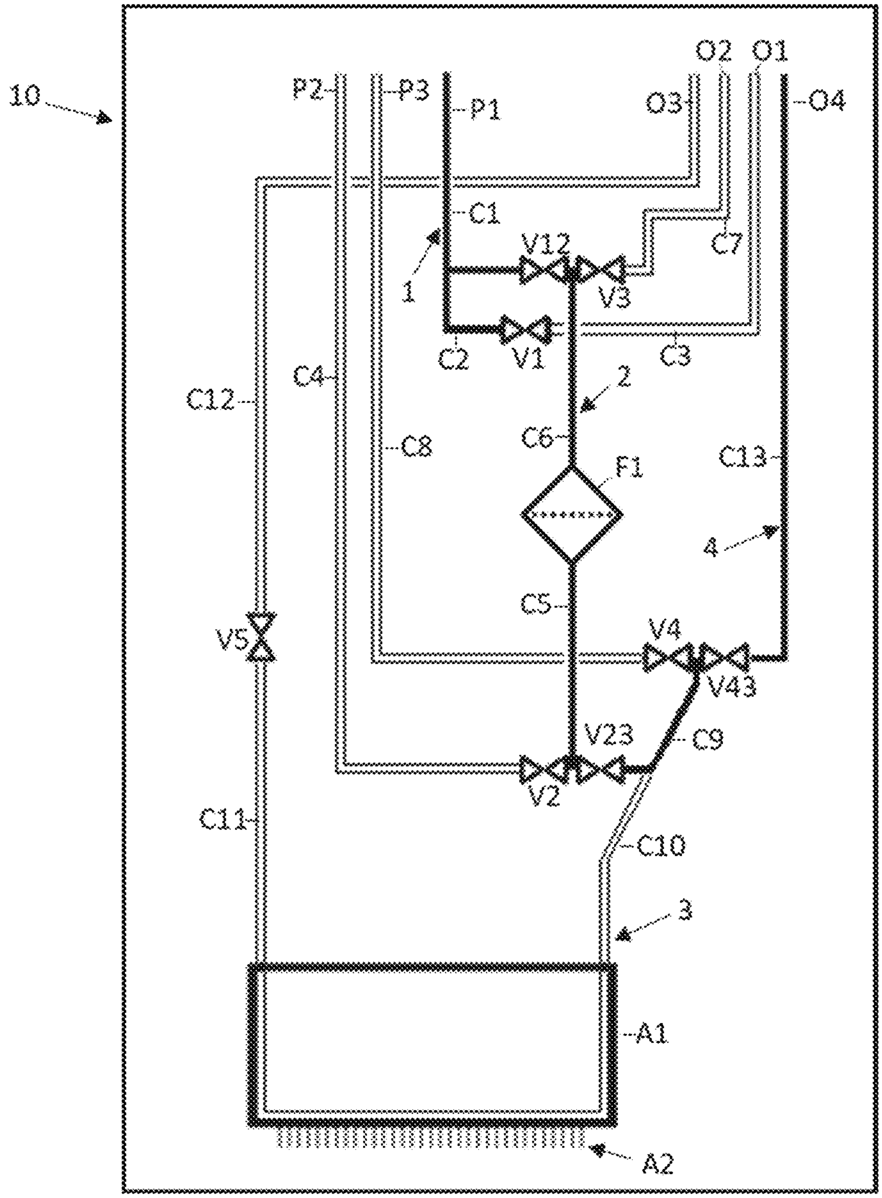
FIG. 3 is a fluidic diagram of the system according to FIG. 1 positioned in a filter circuit priming mode of operation.

This second mode of operation of purging and filling filter circuit 2 with coating product is illustrated in FIG. 3.

The purpose of this second mode of operation is, initially, to purge any residual coating or flushing products from a previous application of undesirable particles. This second mode of operation allows, in particular, to purge filter circuit 2 of any air retentions, the presence of which may be due to a previous flushing of the single filter F1, or to the fact that printing system 10 has not yet been used. In this case, one speaks of de-bubbling of printing system 10. In a second operation, the objective is to fill the pipes, valves and the single filter F1 of filter circuit 2 with coating product.

In the priming sub-operation of filter circuit 2, valves of system 10 are then operated so that supply filter isolation valve V12, print head-filter isolation valve V23, and fill purge isolation valve V43 are open, and supply purge valve V1, filter flush valve V2, filter purge valve V3, print head purge valve V5, and print head flush valve V4 are closed.

Filter circuit 2 is connected to supply circuit 1, head circuit 3 and fill purge circuit 4. In this mode of operation, print head A1 is maintained in isolation from the other circuits by closing print purge valve V5 and closing nozzles A2.

Printing system 10 may then be supplied with coating product to effect the purge and fill of filter circuit 2. Coating product flows in the normal flow direction from supply inlet P1 to fill purge outlet O4.

In this second mode of operation, first conduit C1, sixth conduit C6, fifth conduit C5, ninth conduit C9, thirteenth conduit C13, supply filter isolation valve V12, the single filter F1, print head-filter isolation valve V23, and fill purge isolation valve V43 may be filled with coating product.

System 10 is then positioned in a mode of operation such that filter circuit 2 is purged of residual filter flush fluid and any coating product that is to be expelled from filter circuit 2. Purging is carried out by supply of coating product which, by its flow from supply inlet O1 in supply circuit 1 and filter circuit 2 to supply purge circuit 4, expels unwanted residues through fill purge outlet O4. This, thus, ensures that only coating product is present in filter circuit 2, without impurities that would degrade quality of the coating product. This, thus, also ensures that filter circuit 2 is purged of any air bubbles that could degrade quality of the printing. In this mode of operation, coating product flows in the normal flow direction. In particular, fill purge outlet O4 serves to purge air bubbles that naturally form in ninth conduit C9. Ninth conduit C9, fill purge valve V43, and thirteenth conduit C13 serve the same purpose as a de-bubbling module, but have better compactness, reliability, and service life.

Alternatively, the sub-operation of priming filter circuit 2 may include two operations: a first operation of pressurizing printing system 10 from supply inlet P1 to fill purge isolation valve V43; and a second operation of purging ninth conduit C9. Compared to the sub-operation of priming filter circuit 2 described above, this alternative allows to prime filter circuit 2 and to purge possible air retentions while minimizing quantity of coating product used for priming. Indeed, this alternative requires less coating product, to perform de-bubbling, than the sub-operation of priming filter circuit 2 described above.

In the first pressurization operation of printing system 10, valves are operated so that supply filter isolation valve V12 and print head-filter isolation valve V23 are open, and that supply purge valve V1, filter purge valve V3, filter flush valve V2, print head purge valve V5, print head flush valve V4, and fill purge isolation valve V43 are closed.

As a result, first conduit C1, sixth conduit C6, fifth conduit C5, ninth conduit C9, supply filter isolation valve V12, the single filter F1, and print head-filter isolation valve V23 may be filled with coating product.

Filter circuit 2 is then connected to supply circuit 1 and to head circuit 3, but not to fill purge circuit 4. In this mode of operation, print head A1 is maintained in isolation from the other circuits by closing print purge valve V5 and closing nozzles A2.

Printing system 10 may then be supplied with coating product to pressurize the supplied conduits and elements, since flow of coating product medium is blocked in head circuit 3. Flow of coating product is in the normal flow direction from supply inlet P1 to fill purge isolation valve V43. Pressurization of printing system 10 is accomplished by increasing pressure of coating product flowing in through supply inlet P1.

The advantage of this pressurization operation of printing system 10 is that coating product conveyed from supply inlet P1 pushes air retention contained in sixth conduit C6, the single filter, and fifth conduit C5 toward ninth conduit C9. Advantageously, as pressure in the conduits and the single filter increases with the increase in pressure of coating product conveyed in printing system 10, repelled air bubbles are maintained in ninth conduit C9.

In the second operation of purging ninth conduit C9, fill purge isolation valve V43 is operated to open and supply of coating product is cut off, for example by closing supply filter isolation valve V12 or printing head filter isolation valve V23 (or another valve upstream of the system and not represented). Configuration of the other valves remains unchanged relative to the first pressurization operation of printing system 10.

Coating product that was under pressure in printing system 10, and in particular in ninth conduit C9, may then flow toward fill purge outlet O4, taking air bubbles with it.

This blocks flow of coating product at the time of de-bubbling of printing system 10, and therefore reduces amount of coating product required to prime filter circuit 2.

In this alternative, prior to a cleaning operation of the single filter F1, it is also possible to place print head A1, tenth conduit C10, and eleventh conduit C11 under pressure, closing print head purge valve V5 and nozzles A2, and supplying head circuit 3 with coating product. Thus, it is ensured that air introduced into filter circuit 2 (during the filter F1 cleaning operation) is directed only toward ninth conduit C9 during the pressurizing operation of system 10.

During the operation of priming of the control method, printing system 10 is then positioned in a third mode of operation known as purging and filling head circuit 3 with coating product. This is also referred to as priming head circuit 3. Priming of head circuit 3 may, moreover, be implemented during a third sub-operation of priming head circuit 3, of the operation of priming the control method.

Figure 4:
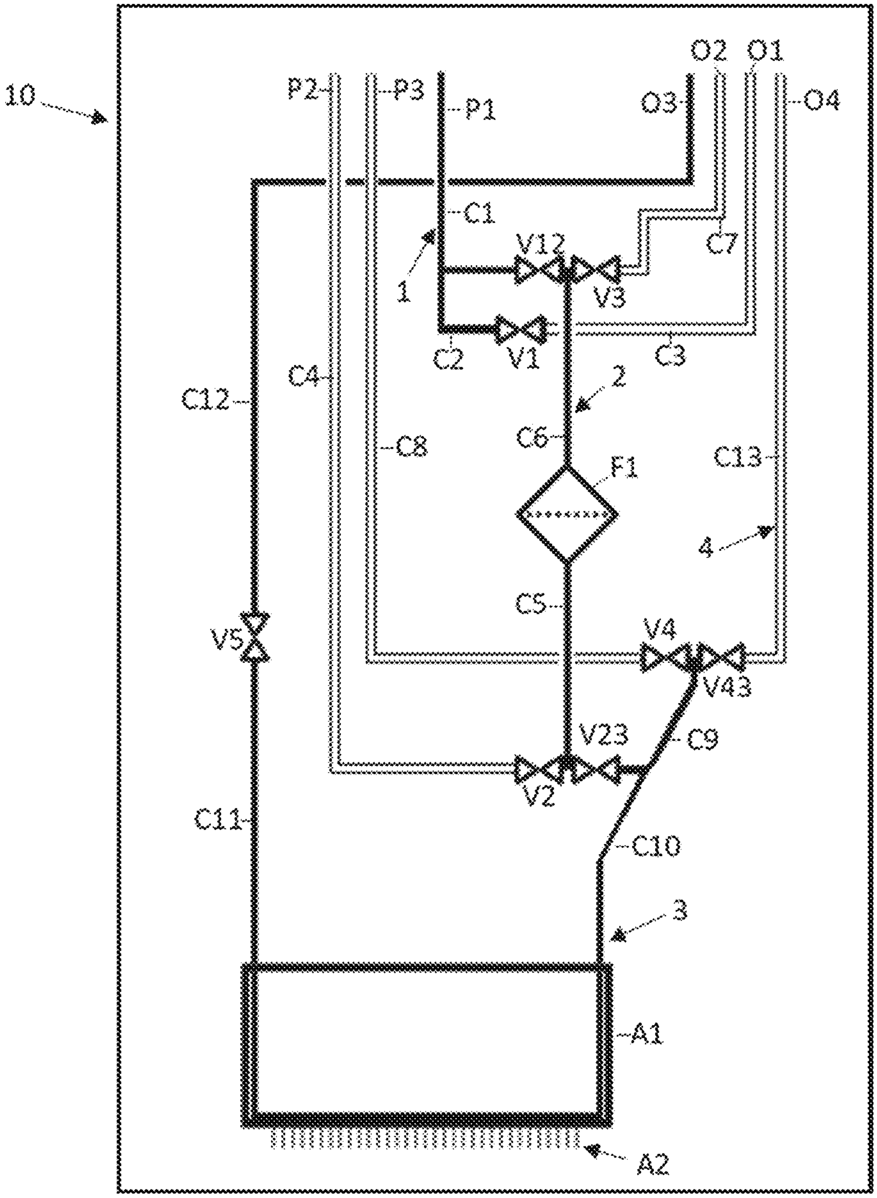
FIG. 4 is a fluidic diagram of the system according to FIG. 1 positioned in a head circuit priming mode of operation.

This third mode of operation of purging and filling head circuit 3 with coating product is illustrated in FIG. 4.

The objective of this third mode of operation is, first, to purge any residues of coating or flushing products from a previous application, undesirable particles, and to purge air contained in the conduits and various elements of head circuit 3, and then, second, to fill the conduits, the valves and print head A1 of head circuit 3 with coating product.

In the sub-operation of priming head circuit 3, valves of system 10 are then operated so that supply filter isolation valve V12, print head-filter isolation valve V23, and print head purge valve V5 are open, and so that fill purge isolation valve V43, supply purge valve V1, filter purge valve V3, filter flush valve V2, and print head flush valve V4 are closed.

Head circuit 3 is thus connected to supply circuit 1 and filter circuit 2. In this mode of operation, fill purge circuit 4 is kept isolated from the rest of the circuits.

Printing system 10 may then be supplied with coating product to purge and fill head circuit 3. Coating product flows in the normal flow direction from supply inlet P1 to print head purge outlet O3.

In this third mode of operation, first conduit C1, sixth conduit C6, fifth conduit C5, tenth conduit C10, eleventh conduit C11, twelfth conduit C12, supply filter isolation valve V12, the single filter F1, print head-filter isolation valve V23, print head purge valve V5, and print head A1 may be filled with coating product.

System 10 is then positioned in a mode of operation such that head circuit 3 is purged of residual print head flush fluid and any coating product that is to be expelled from head circuit 3. The purging is carried out by the coating product supply, which, by its flow from supply inlet O1 in supply circuit 1 and filter circuit 2 to head circuit 3, expels the unwanted residues through print head purge outlet O3. Thus, it ensures that only coating product is present in head circuit 3, without impurities that would degrade quality of the coating product. It, thus, also ensures that the filter circuit is purged of any air bubbles that could degrade quality of the printing. In this mode of operation, coating product flows in the normal flow direction.

Once the various circuits of system 10 have been primed, system 10 is positioned in a fourth mode of operation known as printing the coating product by means of print head A1 onto the object to be coated. The control method thus includes an operation of printing coating product on the object to be coated in order to place printing system 10 in the printing mode.

Figure 5:
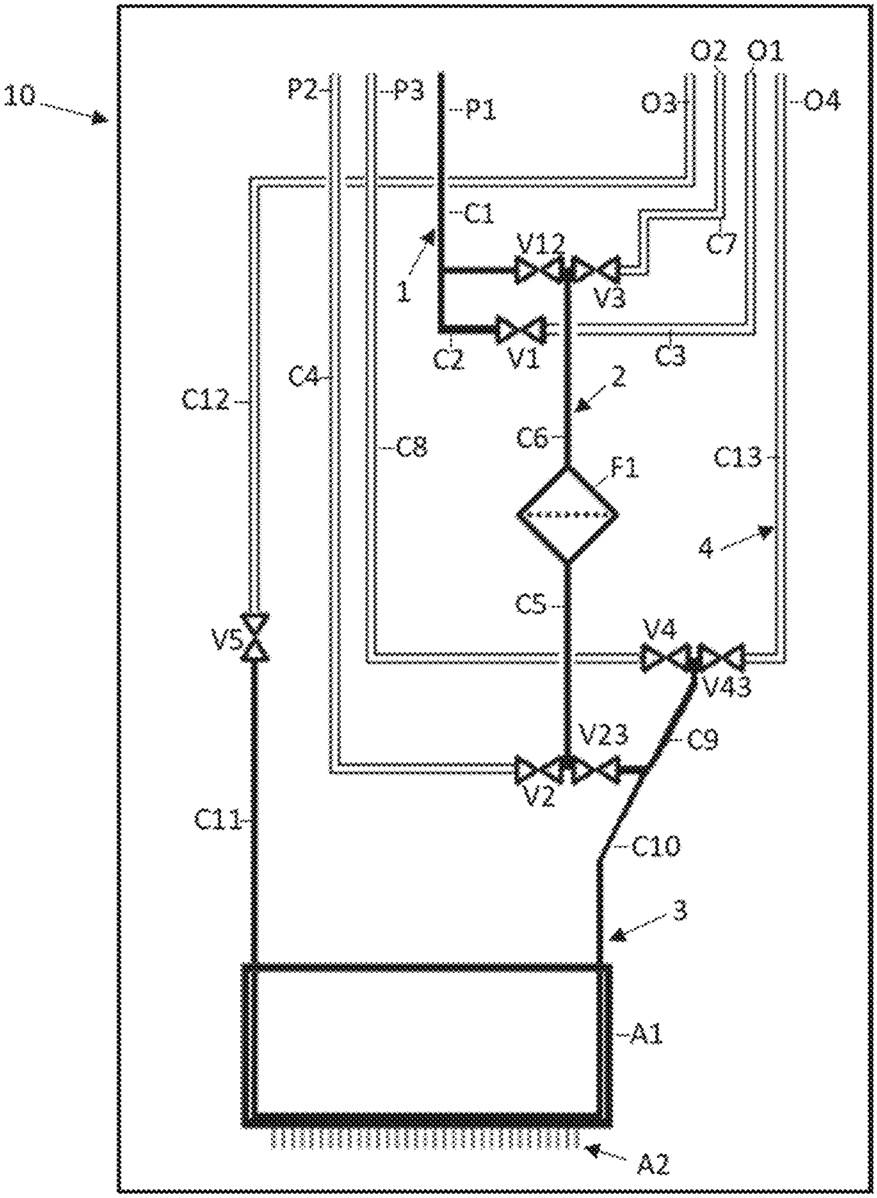
FIG. 5 is a fluidic diagram of the system according to FIG. 1 positioned in a coating product printing mode of operation.

This fourth mode of operation of printing coating product is illustrated in FIG. 5.

The purpose of this fourth mode of operation is to operate the various valves of system 10 so that coating product is delivered from supply inlet P1 to print head A1 where it will be expelled at nozzles A2 onto the object to be coated. In order to carry out the printing, the valves are operated in such a way as to maintain a constant pressure suitable for printing coating product. In this fourth mode of operation, nozzles A2 are open.

During the printing operation of the control method, valves of system 10 are then operated so that supply filter isolation valve V12 and print head-filter isolation valve V23 are open, and supply purge valve V1, filter flush valve V2, filter purge valve V3, print head flush valve V4, fill purge isolation valve V43, and print head purge valve V5 are closed.

Supply circuit 1, filter circuit 2 and head circuit 3 are then connected. In this mode of operation, fill purge circuit 4 is kept isolated from the rest of the circuits.

Printing system 10 may then be supplied with coating product to effect printing of coating product. Coating product flows in the normal flow direction from supply inlet P1 to print head A1, where coating product is expelled from system 10 through nozzles A2.

In this fourth mode of operation, first conduit C1, fifth conduit C5, sixth conduit C6, tenth conduit C10, eleventh conduit C11, supply filter isolation valve V12, the single filter F1, print head-filter isolation valve V23, and print head A1 may be filled with coating product.

System 10 is thus positioned in a mode of operation such that coating product is fed from supply inlet O1 to print head A1 where it is printed on the object to be coated. To do this, coating product flows through supply circuit 1, then through filter circuit 2 where it is filtered of any agglomerates, and finally through head circuit 3. In this mode of operation, coating product flows in the normal flow direction.

During printing of the coating product or before a change of coating product, it may be necessary to flush the single filter F1. This may be the case, for example, if filter F1 is clogged with agglomerates that prevent proper flow of coating product and thus decrease pressure of the coating product in print head A1, thereby decreasing printing performance. This may also be the case if a change of coating product is to be made, to apply another coating product.

In order to flush single filter F1, system 10 is positioned in a fifth mode of operation known as flushing filter circuit 2. The control method thus includes an operation of flushing the single filter F1 in order to place printing system 10 in filter circuit 2 flushing mode.

Figure 6:
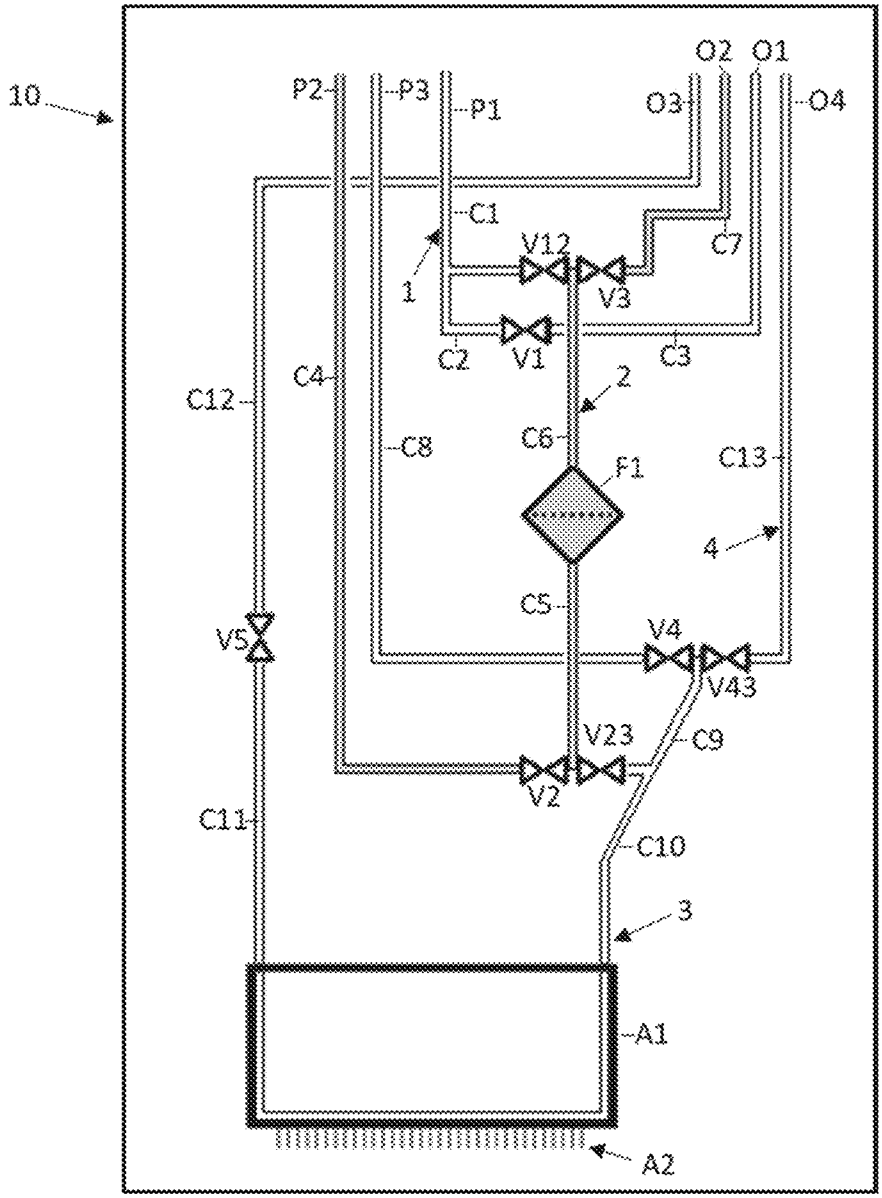
FIG. 6 is a fluidic diagram of the system according to FIG. 1 positioned in a filter flushing mode of operation.

This fifth mode of operation of flushing filter circuit 2 is illustrated in FIG. 6.

The purpose of this fifth mode of operation is to operate various valves of system 10 so that filter circuit 2 is isolated from other circuits. The interest is to be able to circulate filter flush fluid from filter flush inlet P2 to filter purge outlet O2 in order to flush the single filter F1. Filter flush fluid will then be able to flow in the opposite direction to the normal flow direction in filter circuit 2. This opposite flow direction is the optimal direction to flush the single filter F1 and to remove the agglomerates retained in its mesh to filter purge outlet O2.

During the operation of flushing the single filter F1, valves of system 10 are then operated so that filter flush valve V2 and filter purge valve V3 are open, and print head-filter isolation valve V23 and supply filter isolation valve V12 are closed.

Filter circuit 2 is then isolated from the rest of the circuits.

Printing system 10 may then be supplied with filter flush fluid in filter circuit 2 to effect flushing of the single filter F1.

In this fifth mode of operation, fourth conduit C4, fifth conduit C5, sixth conduit C6, seventh conduit C7, filter F1, filter flush valve V2, and filter purge valve V3 are filled with filter flush fluid.

System 10 is thus positioned in a mode of operation such that the single filter F1 is flushed in isolation and independently, without interaction with other circuits of printing system 10. In particular, the single filter F1 is flushed without also having to flush print head A1 and/or supply circuit 1. The single filter F1 is also flushed only in the direction opposite to the normal flow direction, which allows a short flushing time compatible with productivity constraints of printing objects to be coated. Filter F1 may then be flushed with a suitable flush fluid. It can be a mixture of solvent and water pulsed with air at a certain predefined pressure to ensure good removal and evacuation of all the agglomerates. Pressure of the filter flush fluid is advantageously higher than pressure of the print head flush fluid. For example, it is between 1 bar and 20 bar, preferably between 4 bar and 8 bar.

Preferably, the filter flushing is carried out according to an alternative filter flushing sequence including a flushing operation of the single filter F1 by means of a filter flush fluid, for example a solvent, followed by a filter purging operation by means of air, for example forced air. In such a case, the filter flush fluid and the forced air are conveyed in filter circuit 2 from filter flush inlet P2 to filter purge outlet O2. This alternative sequence is better at unclogging and/or flushing the single filter F1 of coating product than flushing with liquid only.

The alternative filter flushing sequence may be repeated one or more times in order to ensure complete flushing of filter circuit 2, and in particular that the single filter F1 is properly unclogged and/or flushed of any coating product. Preferably, air used during this alternative filter flushing sequence will be expelled from printing system 10 when printing system 10 is in the mode of operation of purging and filling filter circuit 2 with coating product described in relation to FIG. 3.

Regardless of flushing filter circuit 2, it may be necessary to flush head circuit 3. For example, to clean the print head of a previously applied coating.

In this case, system 10 is positioned in a sixth mode of operation known as head circuit 3 flushing mode. The control method then includes a print head flushing operation in order to place system 10 in print head A1 flushing mode.

Figure 7:
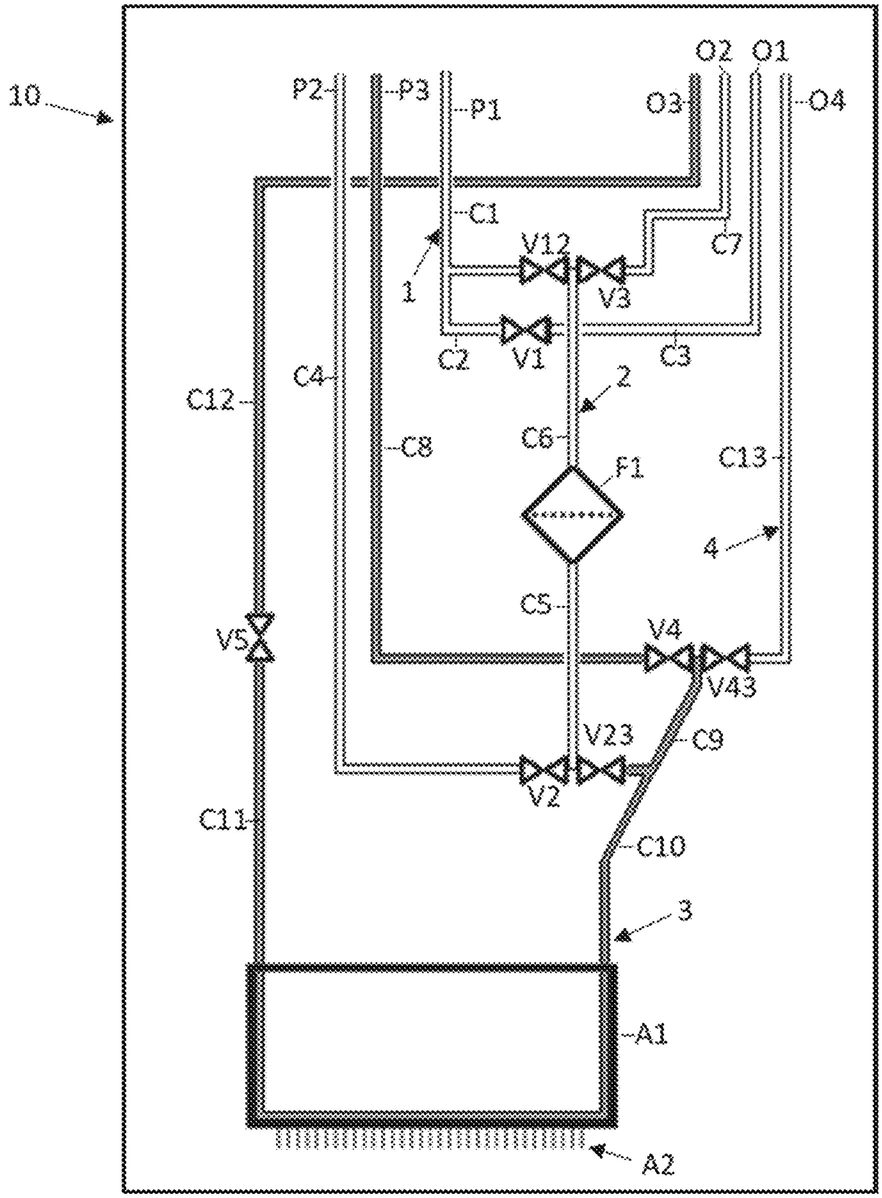
FIG. 7 is a fluidic diagram of the system according to FIG. 1 positioned in a print head flushing mode of operation.

This sixth mode of operation of flushing head circuit 3 is illustrated in FIG. 7.

The purpose of the sixth mode of operation is to operate various valves of system 10 so that head circuit 3 is isolated from other circuits. The interest is to be able to circulate print head flush fluid from print head flush inlet P3 to print head purge outlet O3 in order to flush print head A1. Print head filter flush fluid will then be allowed to flow in the normal flow direction in filter circuit 2.

During the operation of flushing of print head A1, valves of system 10 are then operated so that print head purge valve V5 and print head flush valve V4 are open, and print head-filter isolation valve V23 and fill purge isolation valve V43 are closed. In addition, it is possible to operate print head A1 to clean nozzles A2 of print head A1. In this case, print head purge valve V5 may be open or closed. Preferably, print head purge valve V5 is closed in order to redirect all flush fluid pressure to nozzles A2. The flushing of nozzles A2 is then more efficient.

Head circuit 3 is then isolated from the rest of the circuits.

Printing system 10 may then be supplied with print head flush fluid in head circuit 3 to carry out print head flushing.

In the sixth mode of operation, eighth conduit C8, ninth conduit C9, tenth conduit C10, eleventh conduit C11, twelfth conduit C12, print head A1, print head purge valve V5, and print head flush valve V4 are filled with print head flush fluid.

Thanks to the sixth mode of operation, the print head is flushed in isolation and independently, without interaction with other circuits in system 10. In particular, print head A1 is flushed without also having to flush the single filter F1 and/or supply circuit 1. Print head A2 is also flushed only in the normal flow direction, which allows a short flush time compatible with productivity constraints of printing objects to be coated. In addition, the sixth mode of operation may include opening nozzles A2 to flush nozzles A2. Print head A1 and nozzles A2 may then be flushed with the suitable print head flush fluid, preferably a liquid. This is, for example, a mixture of solvent and water without air, with a pressure suitable for flushing the print head without damaging it and/or nozzles A2 without damaging them. Preferably, print head flush fluid does not contain air in order to avoid the risk of drying residues of coating product in head circuit 3, and in particular at nozzles A2. Pressure of print head flush fluid is, for example, between 0.1 bar and 10 bar, preferably between 1 bar and 3 bar.

Furthermore, ninth conduit C9 is a dead retention zone, in other words, this conduit contains only coating product without flow and without air bubbles. The absence of air bubbles in this conduit allows to ensure that no air bubbles can be drawn in by flow of coating product in tenth conduit C10 at the time of printing. This sixth mode of operation allows to ensure that the dead retention zone that is conduit C9 with stagnant coating product is properly flushed.

Figure 8:
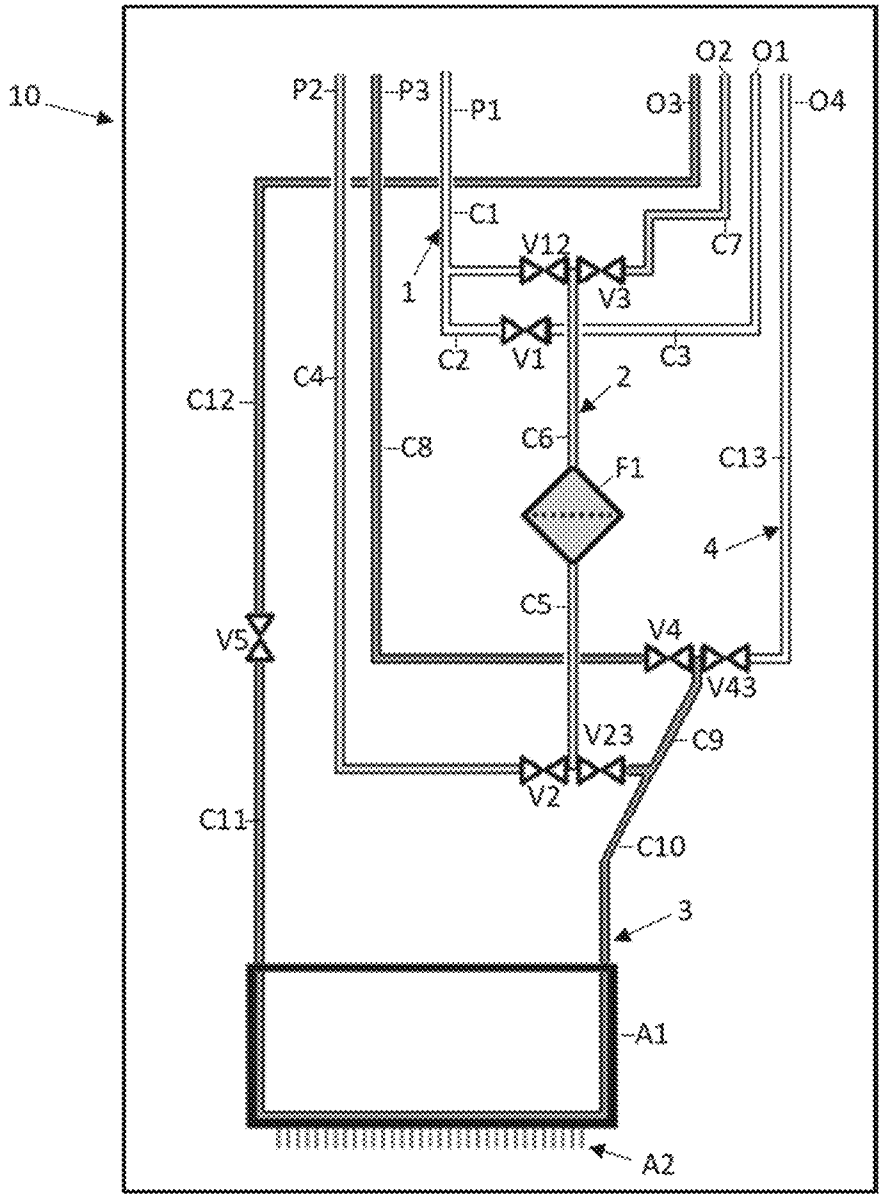
FIG. 8 is a fluidic diagram of the system according to FIG. 1 positioned in a combined system flushing mode of operation.

Through the use of independent and isolable circuits, printing system 10 may be positioned simultaneously in flushing mode of filter circuit 2 and flushing mode of head circuit 3. This simultaneous operation is a seventh mode of operation known as combined flush. This seventh mode of operation is illustrated in FIG. 8.

This seventh combined flush mode may be implemented by means of the control method. To this end, the control method includes a first preliminary operation to the execution of the operations of flushing print head A1 and flushing the single filter F1, this first preliminary operating including closing of supply filter isolation valve V12 and closing of print head-filter isolation valve V23. Thus, head circuit 3 is isolated from filter circuit 2, and filter circuit 2 is isolated from head circuit 3 and supply circuit 1.

Once this first preliminary operation has been carried out, it is possible to implement the operation of flushing print head A1 independently and simultaneously with the operation of flushing the single filter F1.

Thus, thanks to the use of independent and isolable circuits, system 10 may be flushed in a time of less than 20 seconds. Preferably, this time is less than or equal to 15 seconds.

Figure 9:
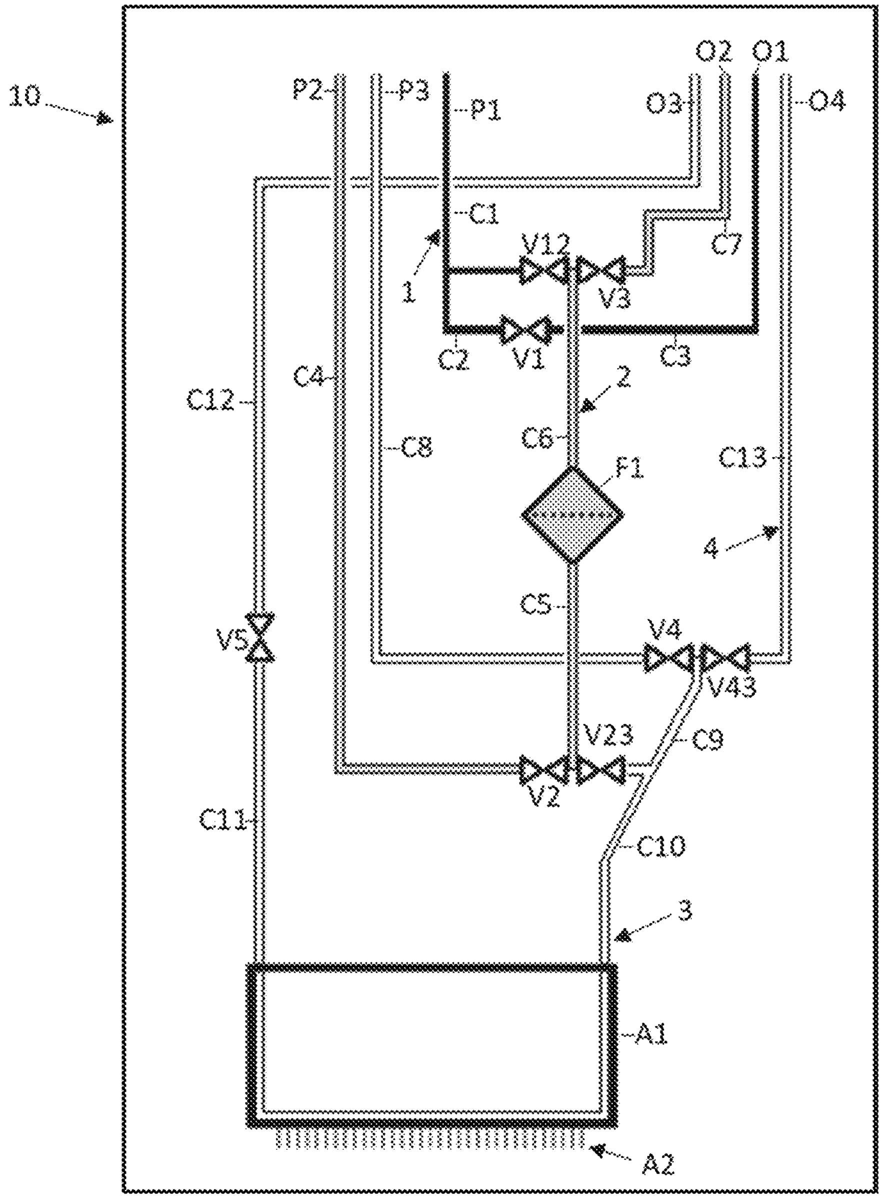
FIG. 9 is a fluidic diagram of the system according to FIG. 1 positioned in a simultaneous flushing of filter circuit 2 and priming mode of operation.

Moreover, thanks to the use of independent and isolable circuits, printing system 10 may be positioned simultaneously in filter circuit 2 flushing mode and priming of supply circuit 1. The simultaneous mode of operation is an eighth mode of operation called simultaneous flushing and priming of filter circuit 2. This eighth mode of operation is illustrated in FIG. 9.

This eighth mode may be implemented by means of the control method. To this end, the control method includes a second preliminary operation to the execution of the operation of flushing the single filter F1 and the sub-operation of priming supply circuit 1, this second preliminary operation including closing of supply filter isolation valve V12. Thus, filter circuit 2 and supply circuit 1 are isolated from each other. In addition, this second preliminary operation may also include closing print head-filter isolation valve V23; thus, filter circuit 2 is isolated from head circuit 3.

Once this second preliminary operation has been carried out, it is possible to implement the operation of flushing the single filter F1 independently and simultaneously with the sub-operation of priming supply circuit 1.

Thus, thanks to the use of independent and isolable circuits, the single filter F1 may be flushed in a time of less than 20 seconds while priming supply circuit 1 with coating product. Preferably, this time is less than or equal to 15 seconds.

Figure 10:
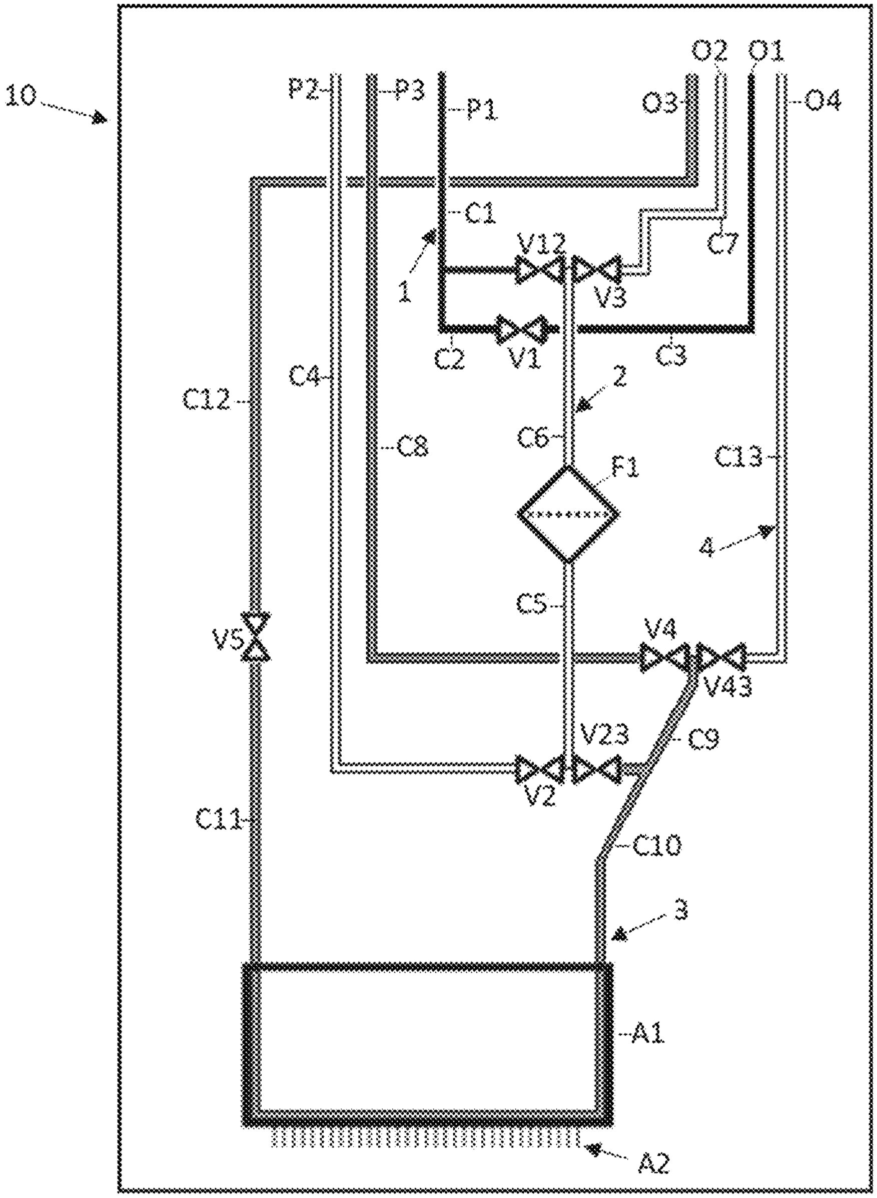
FIG. 10 is a fluidic diagram of the system according to FIG. 1 placed in a simultaneous flushing of head circuit 3 and priming mode of operation.

On the other hand, thanks to the use of independent and isolable circuits, printing system 10 may be positioned simultaneously in flushing mode of head circuit 3 and priming of supply circuit 1. This simultaneous mode of operation is a ninth mode of operation known as simultaneous flushing and priming of head circuit 3. This ninth mode of operation is illustrated in FIG. 10.

The ninth mode may be implemented by means of the control method. To this end, the control method includes a third operation preliminary to execution of the flushing operation of print head A1 and priming sub-operation of supply circuit 1. This second preliminary operation includes closing print head-filter isolation valve V23. Thus, head circuit 3 and filter circuit 2 are isolated from each other. In addition, this second preliminary operation may also include closing supply filter isolation valve V12; thus, isolating supply circuit 1 from filter circuit 2.

Once this second preliminary operation has been carried out, it is possible to implement the operation of flushing print head A1 independently and simultaneously with the sub-operation of priming supply circuit 1.

Thus, thanks to the use of independent and isolable circuits, print head A1 may be flushed in a time of less than 20 seconds while priming supply circuit 1 with coating product. Preferably, this time is less than or equal to 15 seconds.

Figure 11:
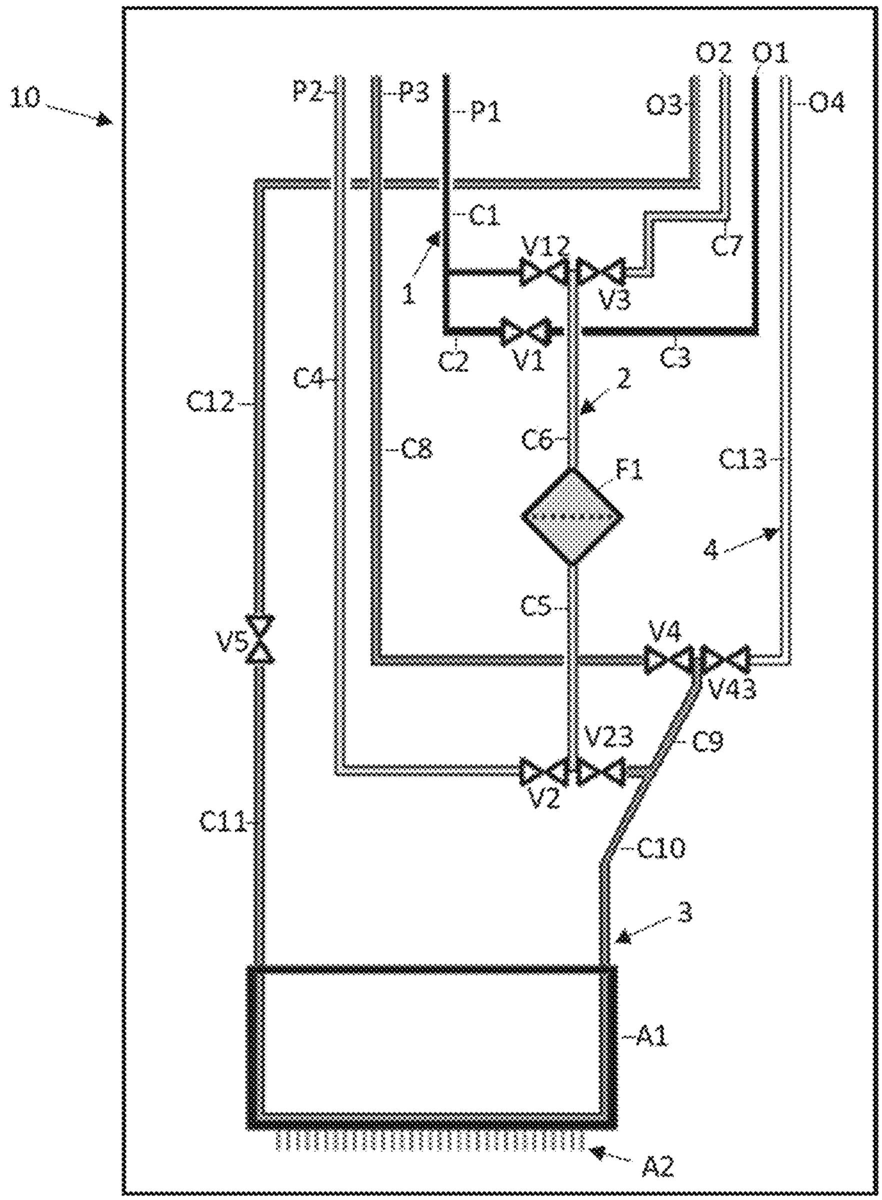
FIG. 11 is a fluidic diagram of the system according to FIG. 1 positioned in a simultaneous flushing of the filter and print head circuits, and priming mode of operation.

Finally, thanks to the use of independent and isolable circuits, printing system 10 may be positioned simultaneously in flushing mode of filter circuit 2, head circuit 3 flushing mode, and priming of supply circuit 1. This simultaneous mode of operation is a tenth mode of operation known as simultaneous flushing of the filter and printing circuits, and priming. This tenth mode of operation is illustrated in FIG. 11.

This tenth mode may be implemented by means of the control method. To this end, a fourth preliminary operation of the control method may be implemented so as to close supply filter isolation valve V12 and print head-filter isolation valve V23. Thus, supply circuit 1, filter circuit 2 and head circuit 3 are isolated from each other.

Once this fourth preliminary operation has been carried out it is possible to implement the operation of flushing the single filter F1, the operation of flushing print head A1 and the sub-operation of priming supply circuit 1 independently and simultaneously with each other.

Thus, thanks to the use of independent and isolable circuits, the single filter F1 and print head A1 may be flushed in a time of less than 20 seconds while priming supply circuit 1 with coating product. Preferably, this time is less than or equal to 15 seconds.

In one embodiment compatible with the preceding embodiments, fill purge isolation valve V43 and print head flush valve V4 are assembled into a single three-way valve. That is, instead of having two separate valves, system 10 has a single three-way valve that carries out the roles, defined above, of both fill purge isolation valve V43 and print head flush valve V4.

In one embodiment compatible with the preceding embodiments, operation of system 10 is ensured thanks to monitoring by the monitoring sensors. These sensors allow the indicators representative of the operating state of the system to be measured. For example, a pressure sensor at the print head, or between the print head purge valve and the print head, allows to monitor that coating product is being properly conveyed to print head A1 and that printing by expelling coating product through nozzles A2 is being properly carried out.

In one embodiment compatible with the preceding embodiments, one or more cameras may be embedded in system 10 to monitor operation of system 10 and detect anomalies in operation. These may include optical cameras or thermal imaging cameras.

If an anomaly is detected using the monitoring sensors, the instructions contained in the electronic board or controller allow to determine an action to correct such anomalies. For example, if a sensor detects that filter F1 is clogged with too many agglomerates, the electronic board or controller will automatically execute instructions to place system 10 in filter circuit 2 flushing mode, as described above. Filter F1 may then be flushed and the agglomerates removed from system 10 via filter purge outlet O2. Next, the electronic board or controller will execute instructions to return system 10 to the coating product printing mode.

Such instructions also exist to place system 10 into the various modes of operation.

In addition, additional instructions may be implemented for practical matters or based on current printing activity. For example, these instructions may be used to implement additional control functions.

Furthermore, in one embodiment compatible with the preceding embodiments, the instructions for placing system 10 in a mode of operation are executed depending on the control instructions. The control instructions are manually or automatically defined rules for indicating how the electronic board or controller is to monitor and operate printing system 10. For example, they may be rules regarding an order of execution of instructions to sequentially place system 10 in different successive modes of operation. In addition, rules may define an instruction execution schedule to place system 10 in a specific mode of operation at a predefined time. This is, for example, the case for scheduling a printing application in an assembly line production of a large number of objects to be coated.

In one embodiment, compatible with the preceding embodiments, supply circuit 1, filter circuit 2, and head circuit 3 may be flushed and/or purged by means of a flush and/or purge fluid from purge outlets of system 10. For this purpose, a purge filter device is installed outside purge outlets of system 10 in order to filter the different products for flushing and/or purging. This embodiment allows supply circuit 1, head circuit 3, and fill purge circuit 4 to be flushed and/or purged in the direction opposite to the normal flow direction. This embodiment also allows for flushing of filter circuit 2 in the normal flow direction. Thus, this embodiment allows various components and conduits of system 10 to be flushed in both directions.

In particular, in such an embodiment, supply circuit 1 may be flushed in the direction opposite to the normal flow direction, by a dedicated flush fluid, from supply purge outlet O1 or from filter purge outlet O2 to supply inlet P1.

In the case where supply circuit 1 is flushed from supply purge outlet O1, supply purge valve V1 is controlled so as to be open, and supply filter isolation valve V12 is controlled so as to be closed.

In the case where supply circuit 1 is flushed from filter purge outlet O2, supply purge valve V1, print head-filter isolation valve V23, and filter flush valve V2 are controlled so as to be closed, whereas supply filter isolation valve V12 and filter purge valve V3 are controlled so as to be open.

Alternatively, supply circuit 1 may be flushed by means of filter flush fluid in the direction opposite to the normal flow direction, from filter flush inlet P2 toward supply inlet P1. In such a case, filter flush valve V2 and supply filter isolation valve V12 are controlled so as to be open, while supply flush valve V1, print head-filter isolation valve V23, and filter flush valve V3 are controlled so as to be closed.

The invention claimed is:

1. A printing system for applying a coating product to an object to be coated, the printing system comprising:
- a print head for applying the coating product to the object to be coated, the coating product flowing in a normal flow direction;
- a single filter positioned upstream of said print head to filter the coating product;
- a plurality of valves and conduits adapted to convey the coating product, a filter flush fluid, and a print head flush fluid, the plurality of valves and conduits being arranged to form:
  - a coating product supply circuit;
  - a filter circuit adapted to convey the coating product through said single filter in the normal flow direction, and to convey the filter flush fluid through said single filter only in a direction opposite to the normal flow direction; and
  - a head circuit adapted to convey the coating product and the print head flush fluid through said print head in the normal flow direction;
- a supply filter isolation valve configured to:
  - in a closed state, isolate said coating product supply circuit from said filter circuit;
  - in an open state, connect said coating product supply circuit to said filter circuit; and
- a print head-filter isolation valve configured to:
  - in a closed state, isolate said filter circuit from said head circuit;
  - in an open state, connect said filter circuit to said head circuit;
- wherein said filter circuit further comprises:
  - a filter flush valve arranged vis-à-vis said print head-filter isolation valve; and a filter purge valve arranged vis-à-vis said supply filter isolation valve, and
  - wherein said supply filter isolation valve, said print head-filter isolation valve, said filter flush valve, and said filter purge valve are two-way valves.

2. The printing system according to claim 1, wherein:
- said supply filter isolation valve, said print head-filter isolation valve, said filter flush valve and said filter purge valve each comprise:
  - a seat; and
  - a needle for abutting the seat,
- wherein said needle of said filter flush valve and said needle of said print head-filter isolation valve are aligned and point in opposite directions toward a common first conduit portion, and
- wherein said needle of said filter purge valve and said needle of said supply filter isolation valve are aligned and point in opposite directions toward a second common conduit portion.

3. The printing system according to claim 2, wherein the first common conduit portion separates said filter flush valve seat and said print head-filter isolation valve seat and presents a length between 1 mm and 10 mm, and wherein the second common conduit portion separates said filter flush valve seat and said supply filter isolation valve seat and presents a length between 1 mm and 10 mm.

4. The printing system according to claim 1, wherein said filter circuit further comprises a filter flush inlet, the filter flush inlet being adapted to supply said filter circuit with filter flush fluid, and wherein said filter flush valve is configured to:
- in an open state, connect said single filter to said filter flush inlet;
- in a closed state, isolate said single filter from said filter flush inlet.

5. The printing system according to claim 1, wherein said filter circuit further comprises a filter purge outlet, the filter purge outlet being adapted to purge said filter circuit with filter flush fluid, said filter purge valve being configured to:
- in an open state, connect said single filter and said filter purge outlet;
- in a closed state, isolate said single filter from said filter purge outlet.

6. The printing system according to claim 1, wherein said supply circuit comprises:
- a supply inlet;
- a supply purge valve; and
- a supply purge outlet, wherein said supply inlet is adapted to supply said supply circuit with coating product, wherein said supply purge outlet is adapted to purge said supply circuit of coating product, said supply purge valve being configured to:

in an open state, connect said supply inlet and said supply purge outlet;

in a closed state, isolate said supply inlet from said supply purge outlet.

7. The printing system according to claim 1, further comprising:

a fill purge circuit; and a fill purge isolation valve, wherein said fill purge isolation valve is configured to:

in an open state, connect said head circuit to said fill purge circuit;

in a closed state, isolate said head circuit from said fill purge circuit.

8. The printing system according to claim 7, wherein said head circuit further comprises a print head flush valve arranged vis-à-vis said fill purge isolation valve, and wherein said print head flush valve and said fill purge isolation valve are two-way valves.

9. The printing system according to claim 1, wherein said head circuit further comprises:

a print head purge valve; and a print head purge outlet, the print head purge outlet being adapted to purge said head circuit of print head flush fluid and coating product, wherein said print head purge valve is configured to:

in an open state, connect said print head and said print head purge outlet;

in a closed state, isolate said print head from said print head purge outlet.

10. The printing system according to claim 1, wherein said single filter comprises a first end and a second end, said single filter being arranged so that coating product is conveyed along the axis of said single filter entering by the first end of said single filter and exiting the second end, and flush fluid is conveyed along the axis of said single filter entering by the second end of said single filter and exiting by the first end.

11. A control method for controlling the printing system according to claim 1, the control method including one or more of the following operations:

priming with the coating product at least a portion of the printing system;

printing of the coating product on the object to be coated;

flushing the print head of the printing system; and flushing the single filter of the printing system.

12. The control method according to claim 11, wherein said flushing the print head and said flushing the single filter are implemented simultaneously by closing the supply filter isolation valve of the printing system and the print head-filter isolation valve of the printing system.

13. The control method according to claim 12, wherein a filter flush fluid pressure is greater than a print head flush fluid pressure.

14. The control method according to claim 11, further comprising priming the supply circuit of the printing system with coating product, wherein said flushing the single filter and said priming the supply circuit are implemented simultaneously by closing the supply filter isolation valve of the printing system.

15. The control method according to claim 11, further comprising priming the supply circuit with coating product, and wherein said flushing the print head and said priming the supply circuit are implemented simultaneously by closing the print head-filter isolation valve of the printing system.

* * * * *